(12) United States Patent
Whitten

(10) Patent No.: US 10,848,906 B2
(45) Date of Patent: Nov. 24, 2020

(54) AUTOMATED SUPPLEMENTAL SERVICES USING ELECTRICAL DEVICES

(71) Applicant: SIGNIFY HOLDING B.V., Eindhoven (NL)

(72) Inventor: Jonathan Whitten, Fishers, IN (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/688,528

(22) Filed: Nov. 19, 2019

(65) Prior Publication Data

US 2020/0162839 A1 May 21, 2020

Related U.S. Application Data

(60) Provisional application No. 62/770,111, filed on Nov. 20, 2018, provisional application No. 62/770,110, filed on Nov. 20, 2018.

(51) Int. Cl.
| | |
|---|---|
| H04W 4/021 | (2018.01) |
| H04W 4/029 | (2018.01) |
| H04W 4/80 | (2018.01) |
| H04W 4/50 | (2018.01) |
| H04L 29/08 | (2006.01) |
| H04W 4/02 | (2018.01) |

(52) U.S. Cl.
CPC ............ *H04W 4/021* (2013.01); *H04L 67/16* (2013.01); *H04L 67/18* (2013.01); *H04W 4/023* (2013.01); *H04W 4/029* (2018.02); *H04W 4/50* (2018.02); *H04W 4/80* (2018.02)

(58) Field of Classification Search
CPC ...................................... H04W 4/021
USPC ...................................... 455/456.1
See application file for complete search history.

(56) References Cited

U.S. PATENT DOCUMENTS

| | | |
|---|---|---|
| 2004/0220830 A1 | 11/2004 | Moreton et al. |
| 2019/0236553 A1 | 8/2019 | Maki et al. |
| 2019/0303424 A1 | 10/2019 | Wutscher |

*Primary Examiner* — Joel Ajayi

(57) ABSTRACT

A system for performing at least one supplemental service relative to a user in a volume of space. The system can include a electrical device disposed at a location in the volume of space and including a receiver, a supplemental service module, and a controller, where the receiver has a communication range, where the controller controls the timer, and where the electrical device performs a primary function. The system can also include a user device of a user disposed within the communication range, where the user device includes a beacon that sends at least one communication signal. The controller, upon the receiver receiving the at least one communication signal, can initiate, using the at least one supplemental service module, the at least one supplemental service that is unrelated to the primary function of the electrical device.

20 Claims, 8 Drawing Sheets

AUTOMATED SUPPLEMENTAL SERVICES USING ELECTRICAL DEVICES

CROSS REFERENCE TO RELATED APPLICATIONS

This application claims priority under 35 U.S.C. § 119 to U.S. Provisional Patent Application Ser. No. 62/770,111, titled "Automated Dictation and Transcription Using Electrical Devices" and filed on Nov. 20, 2018, and to U.S. Provisional Patent Application Ser. No. 62/770,110, titled "Automated Time Tracking Using Electrical Devices" and filed on Nov. 20, 2018. The entire contents of these aforementioned applications are hereby incorporated herein by reference.

TECHNICAL FIELD

Embodiments described herein relate generally to systems, methods, and devices for providing supplemental services using electrical devices.

BACKGROUND

In a number of applications, particularly in certain professional settings, a person handling various tasks (e.g., treating multiple patients in a hospital, taking notes over the course of a work day) is required to document these tasks. As the number of tasks increases, it becomes more difficult and/or time-consuming for that person to set the time aside to generate the documents. For example, a person who has to visit multiple patients in a hospital may need to track the amount of time spent with each patient. As another example, a person may need to take notes of each task performed (e.g., patient discussion and diagnosis). When the number of tasks that a person works on in a day are in the dozens, and when this number of tasks handled by a person in a day is more common than not, a great deal of administrative time must be spent by the person to record time spent on each task.

SUMMARY

In general, in one aspect, the disclosure relates to a system for performing at least one supplemental service relative to a user in a volume of space. The system can include a first electrical device disposed at a first location in the volume of space and comprising a first receiver, a first supplemental service module, and a first controller, where the first receiver has a first communication range, where the first controller controls the first timer, and where the first electrical device performs a first primary function. The system can also include a first user device of a first user disposed within the first communication range, where the first user device comprises a first beacon capable of communicating with the first receiver when the first beacon is located within the first communication range, where the first beacon sends at least one first communication signal, where the at least one first communication signal includes a first identification of the first user. The first controller, upon the first receiver receiving the at least one first communication signal, can initiate, using the at least one supplemental service module, the at least one supplemental service that is unrelated to the first primary function of the first electrical device.

In another aspect, the disclosure can generally relate to a controller for performing at least one supplemental service relative to a user in a volume of space, where the controller comprises a control engine. The control engine can be configured to receive information associated with at least one communication signal received from a user device located in the volume of space within a communication range of an electrical device. The control engine can also be configured to initiate, using the information, the at least one supplemental service, where the at least one supplemental service is unrelated to a primary function of the electrical device. The control engine can further be configured to terminate the at least one supplemental service when the electrical device stops receiving the at least one communication signal from the user device.

These and other aspects, objects, features, and embodiments will be apparent from the following description and the appended claims.

BRIEF DESCRIPTION OF THE DRAWINGS

The drawings illustrate only example embodiments of providing automated supplemental services using electrical devices and are therefore not to be considered limiting of its scope, as providing automated supplemental services using electrical devices may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
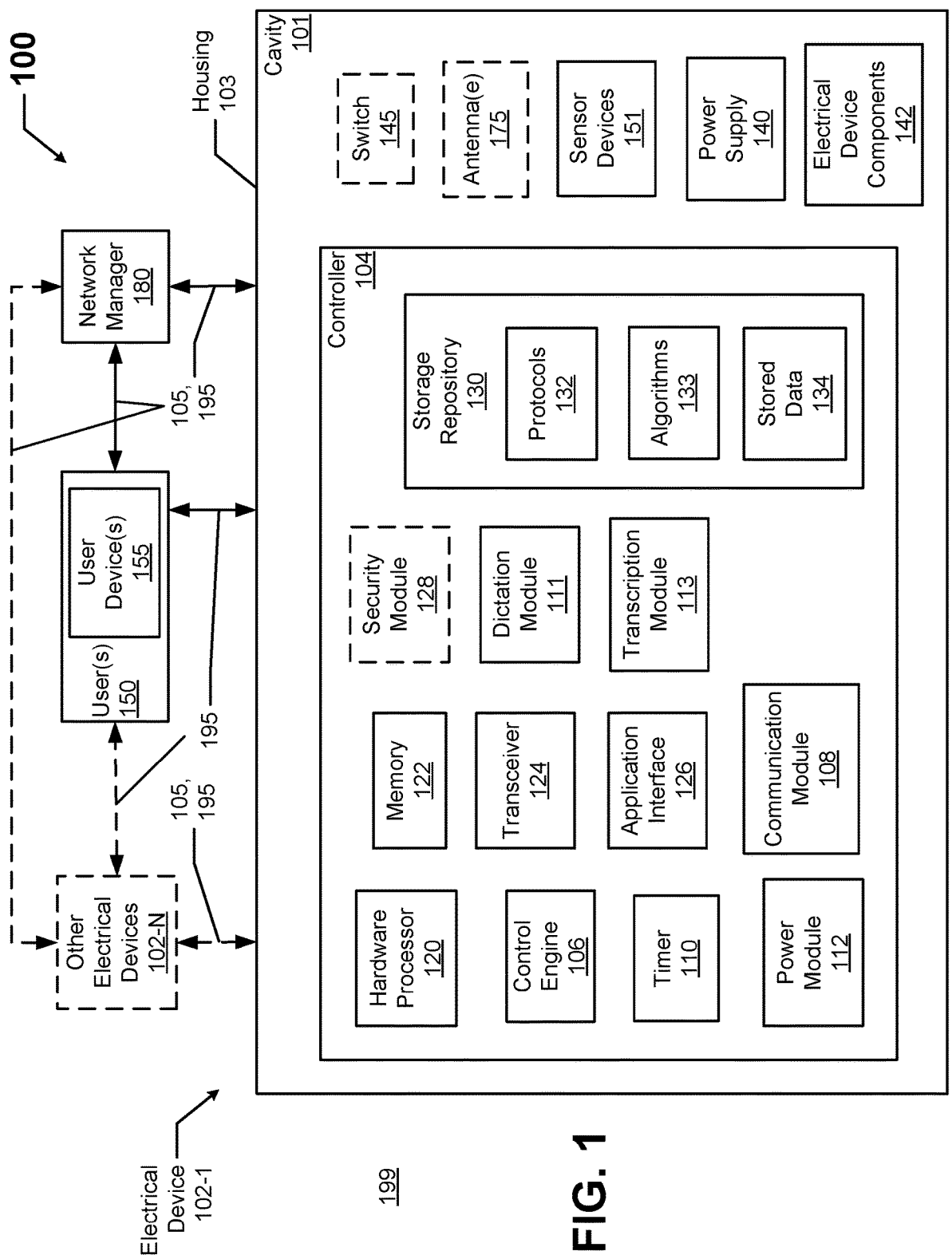
FIG. 1 shows a diagram of a system that includes an electrical device in accordance with certain example embodiments.

The example embodiments discussed herein are directed to systems, methods, and devices for providing automated supplemental services using electrical devices. While example embodiments are described herein as using a light fixture (or components thereof) to provide automated supplemental services, example embodiments can use one or more of a number of other electrical devices in addition to, or as an alternative to, light fixtures (also sometimes referred to as luminaires). Such other electrical devices can include, but are not limited to, a light switch, a control panel, a clock, a coffee maker, a microwave oven, a wall outlet, a smoke detector, a $CO_2$ monitor, a motion detector, a broken glass sensor, a camera, and an integrated sensor device (discussed below). A light fixture can provide general illumination, as that term is understood to those of ordinary skill in the art. In addition, or in the alternative, a light fixture can provide other types of light, including but not limited to accent lighting, task lighting, theatrical lighting, and ambient lighting.

As defined herein, an automated supplemental service is any function or service that is different than the primary function of the electrical device used to provide the automated supplemental service. For example, if the electrical device is a light fixture, then the primary function of the light fixture is to provide general illumination to a volume of space. By contrast, one or more automated supplemental services that can be provided by such an electrical device in the form of a light fixture according to example embodiments can include, but are not limited to, time tracking, performing dictation, and performing transcription.

Example embodiments can be used for a volume of space having any size and/or located in any environment (e.g., indoor, outdoor, hazardous, non-hazardous, high humidity, low temperature, corrosive, sterile, high vibration, residential, office space, factory, industrial). Further, example embodiments can be used with any of a number of types of signals and/or technologies, including but not limited to radio frequency (RF) signals, WiFi, Bluetooth, Bluetooth Low Energy (BLE), RFID, ultraviolet waves, microwaves, and infrared signals. Example embodiments can be used to provide automated supplemental services in real time.

When an electrical device is a light fixture, the light fixture can use one or more of a number of different types of light sources, including but not limited to light-emitting diode (LED) light sources, fluorescent light sources, organic LED light sources, incandescent light sources, and halogen light sources. Therefore, light fixtures described herein, regardless of the environment in which they are disposed, should not be considered limited to a particular type of light source. Also, the light fixture can be any type of light fixture, including but not limited to a down can light, a pendant light, a high bay light, a vanity light, a spotlight a flood light, and a wall sconce.

In certain example embodiments, light fixtures or other electrical devices used to automatically perform supplemental services are subject to meeting certain standards and/or requirements. For example, the National Electric Code (NEC), the National Electrical Manufacturers Association (NEMA), the International Electrotechnical Commission (IEC), Underwriters Laboratories (UL), the Federal Communication Commission (FCC), the Bluetooth Special Interest Group, and the Institute of Electrical and Electronics Engineers (IEEE) set standards that can be applied to electrical enclosures (e.g., housings of light fixtures), wiring, location services, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of providing automated supplemental services using electrical devices will be described more fully hereinafter with reference to the accompanying drawings, in which example embodiments of providing automated supplemental services using electrical devices are shown. Providing automated supplemental services using electrical devices may, however, be embodied in many different forms and should not be construed as limited to the example embodiments set forth herein. Rather, these example embodiments are provided so that this disclosure will be thorough and complete, and will fully convey the scope of providing automated supplemental services using electrical devices to those of ordinary skill in the art. Like, but not necessarily the same, elements (also sometimes called components) in the various figures are denoted by like reference numerals for consistency.

Terms such as "first", "second", "outer", "inner", "top", "bottom", "on", and "within" are used merely to distinguish one component (or part of a component or state of a component) from another. Such terms are not meant to denote a preference or a particular orientation. Such terms are not meant to limit embodiments of providing automated supplemental services using electrical devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes an electrical device 102-1 in accordance with certain example embodiments. In addition to the electrical device 102-1, the system 100 can include one or more optional other electrical devices 102-N, a user 150 (which includes one or more user devices 155), and a network manager 180. One or more of these components of the system 100 are located in a volume of space 199. The electrical device 102-1 and the other electrical devices 102-N can collectively be referred to herein as the electrical devices 102.

The electrical device 102-1 (as well as any optional other electrical devices 102-N) can include a controller 104, one or more optional antenna 175, an optional switch 145, one or more sensor devices 151, a power supply 140, and a number of electrical device components 142. The controller 104 can include one or more of a number of components. Such components, can include, but are not limited to, a control engine 106, a communication module 108, a timer 110, a power module 112, an optional dictation module 111, an optional transcription module 113, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in the example system 100. For instance, any component of the example electrical device 102-1 can be discrete or combined with one or more other components of the electrical device 102-1. For example, rather than one optional switch 145, there can be multiple optional switches 145. As another example, the optional switch 145 can be part of the controller 104. As yet another example, one or more components shown for the electrical device 102-1 can be included in, excluded from, or shared with one or more of the optional other electrical devices 102-N.

The volume of space 199 is a locale in which example embodiments can be implemented. The volume of space 199 can be indoors and/or outdoors. The volume of space 199 can be in a residential, commercial, and/or industrial setting. The volume of space 199 can have any type of climate (e.g., humid, dry, cold, hot, controlled) and/or in any type of setting (e.g., hazardous, corrosive). Examples of a volume of space 199 can include, but are not limited to, a home, a hospital wing, a nursing home, a shopping mall, a delivery route, a school, a parking garage, a parking lot, a laboratory, a manufacturing facility, a chemical plant, and a restaurant.

A user 150 (including a user device 155) can be any person who interacts with one or more of the example electrical devices 102 in the volume of space 199. For example, a user 150 possessing a user device 155 may activate one or more portions of the controller 104 of the electrical device 102-1 to perform automated supplemental services for one or more users 150. Examples of a user 150 may include, but are not limited to, a doctor, a nurse, a pharmacist, a salesperson, a human resources professional, an attorney, a reporter, a law enforcement officer, a patient database, a medical supply company, a service provider, a homeowner, a landlord, a technician, an operator, a consultant, a contractor, the network manager 180, and a manufacturer's representative.

A user 150 can have or include one or more user devices 155. A user device 155 can be an active (e.g., include a controller) or a passive (e.g., a bar code, a QR code) system that initiates or otherwise establishes contact with the controller 104 of the electrical device 102-1 so that the controller 104 can perform automated supplemental services for the user 150 associated with the user device 155. Examples of a user device 155 can include, but are not limited to, an identification badge, a smart phone, an electronic tablet, an article of smart clothing (e.g., a hat, a shirt, a jacket), a clipboard, and a chip implanted in a user 150. In some cases, a user device 155 can include one or more components (e.g., a control engine, a timer, a storage repository, a power supply) that are included in the electrical device 102-1. In some cases, the user device 102-1 and/or the network manager 180 can have one or more applications (also called apps) loaded thereon for facilitating implementation of example embodiments by a user 150.

A user device 155 can send communication signals 195 to and/or receive communication signals 195 from the electrical device 102-1. A user device 155 can include one or more components (e.g., switch, antenna, transceiver) of the electrical device 102-1 and/or functionality described below with respect to the controller 104 of the electrical device 102-1. The communication signals 195 described herein can be RF signals that are transmitted in any of a number of ways, including BLE. A communication signal 195 can additionally or alternatively be any other type of signal, including but not limited to a sound wave (e.g., a tone, a song, music, a spoken word or phrase), visible light, and a gesture.

Using example embodiments, a user device 155 (also sometimes called a beacon 155 or a user system 155) of a user 150 can be in sleep mode until the user device 155 receives a communication signal 195 broadcast by the electrical device 102-1. When this occurs, the user device 155 can turn on long enough to interpret the initial communication signal 195, and then generate and send its own communication signal 195 to the electrical device 102-1 in response to the initial communication signal 195.

Alternatively, a user device 155 of a user 150 can be in sleep mode until some pre-determined point in time (e.g., every hour, every 24 hours) that is independent of the electrical device 102-1 or communication signals 195 sent by the electrical device 102-1. When this occurs, the user device 155 can turn on long enough to send (broadcast) a communication signal 195 into the volume of space 199, where the communication signal 195 can be received by the electrical device 102-1 and/or one or more of the other electrical devices 102-N. In any case, the communication signal 195 sent by a user device 155 can include a UUID (or some other form of identification) associated with a user 150. Once the communication signal 195 is sent by a user device 155, the user device 155 can go back into sleep mode, thereby reserving a considerable amount of power.

A user device 155 of a user 150 can use one or more of a number of communication protocols (types of protocols 132) in sending and/or receiving communication signals 195 with the electrical device 102-1. In certain example embodiments, a user device 155 can include a battery (a form of power supply or power module) that is used to provide power to the user device 155. In certain example embodiments, the user device 155 can include multiple antennae and a corresponding switch, where an antenna is substantially the same as an antenna 175 described below with respect to the electrical device 102-1, and the optional switch is substantially the same as the optional switch 145 described below with respect to the electrical device 102-1. Alternatively, a user device 155 of a user 150 can include a single antenna or have no antenna.

Each of the one or more optional electrical devices 102-N can be substantially similar to, or different than, the electrical device 102-1. For example, an optional other electrical device 102-N can include one or more components (e.g., controller 104, switch 145, sensor devices 151) that are shown and described below with respect to the electrical device 102-1. In some cases, an optional electrical device 102-N has one or more additional components or one or more fewer components compared to what is shown and described below with respect to the electrical device 102-1. In some case, one or more components of the electrical device 102-1 can be shared with one or more optional other electrical device 102-N. When the system 100 includes multiple electrical devices 102, those electrical devices 102 can be configured to communicate with each other, directly or indirectly, using communication signals 195.

The network manager 180 is a device or component that controls all or a portion of the system 100 that includes the controller 104 of the electrical device 102-1. The network manager 180 can be substantially similar to (e.g., in terms of components, in terms of functionality) the controller 104 of the electrical device 102-1. Alternatively, the network manager 180 can include one or more of a number of features in addition to, or altered from, the features of the controller 104 of the electrical device 102-1 described below. In some cases, the network manager 180 can share some components and/or capability of the controller 104 of the electrical device 102-1. In some cases, the network manager 180 can be the controller 104 of the electrical device 102-1.

A user 150 can interact with (e.g., sends communication signals 195 to) one or more sensor devices 151 of the electrical device 102-1 (and, in some cases, of one or more of the optional other electrical devices 102-N). In addition, or in the alternative, a user system 155 associated with a user 150 interacts with (e.g., sends communication signals 195 to, receives communication signals 195 from) the controller 104 of the electrical device 102-1 (and, in some cases, one or more of the optional other electrical devices 102-N) via the application interface 126 (described below). A user 150 (or an associated user device 155) can also interact with the network manager 180. Interaction between a user 150 (including an associated user system 155), the electrical devices 102, and the network manager 180 is conducted in the form of communication signals 195 using one or more communication links 105.

Each communication link 105 can include wired (e.g., Class 1 electrical cables, Class 2 electrical cables, electrical connectors) and/or wireless (e.g., Wi-Fi, visible light communication, cellular networking, BLE, Bluetooth, WirelessHART, ISA100, Power Line Carrier, RS485, DALI) technology. For example, a communication link 105 can be (or include) one or more electrical conductors that are coupled to the housing 103 of an electrical device 102 and to the network manager 180. The communication link 105 can transmit communication signals 195 (e.g., control signals, data) between one or more of the electrical devices 102, a user 150 (including an associated user device 155), and the network manager 180.

A user 150 (including an associated user device 155), the network manager 180, and/or any other optional electrical devices 102-N can interact with the controller 104 of the electrical device 102-1 using the application interface 126 in accordance with one or more example embodiments. Specifically, the application interface 126 of the controller 104 receives data (e.g., information, communications, instructions) from and sends data (e.g., information, communications, instructions) to a user 150 (including an associated user device 155), the controller 104 of one or more other electrical devices 102-N, and/or the network manager 180.

A user device 155 and the network manager 180 can include an interface to receive data from and/or send data to the controller 104 of the electrical device 102-1 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. Similarly, the electrical device 102-1 and/or the other electrical devices 102-N can include such an interface.

The controller 104 of the electrical device 102-1, the controllers of one or more other electrical devices 102-N, a user 150 (including an associated user device 155), and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102-1 can include a housing 103. The housing 103 can include at least one wall that forms a cavity 101. In some cases, the housing 103 can be designed to comply with any applicable standards so that the electrical device 102-1 can be located in a particular environment (e.g., a hazardous environment). For example, if the electrical device 102-1 is located in an outdoor environment, the housing 103 can be rated (e.g., water resistant) for such outdoor use.

The housing 103 of the electrical device 102-1 can be used to house one or more components of the electrical device 102-1, including one or more components of the controller 104. For example, as shown in FIG. 1, the controller 104 (which in this case includes the control engine 106, the communication module 108, the timer 110, the dictation module 111, the transcription module 113, the power module 112, the storage repository 130, the hardware processor 120, the memory 122, the transceiver 124, the application interface 126, and the optional security module 128), the power supply 140, the one or more antenna 175, the optional switch 145, one or more of the sensor devices 151, and the electrical device components 142 are disposed in the cavity 101 formed by the housing 103. In alternative embodiments, any one or more of these or other components of the electrical device 102-1 can be disposed on the housing 103 and/or remotely from the housing 103.

The storage repository 130 can be a persistent storage device (or set of devices) that stores software and data used to assist the controller 104 in communicating with a user 150 (including an associated user device 155), the network manager 180, and any other applicable electrical devices 102-N within the system 100. In one or more example embodiments, the storage repository 130 stores one or more protocols 132, one or more algorithms 133, and stored data 134. The protocols 132 can be any procedures (e.g., a series of method steps) and/or other similar operational procedures that the control engine 106 of the controller 104 follows based on certain conditions at a point in time. The protocols 132 can include any of a number of communication protocols that are used to send and/or receive data between the controller 104 and a user 150 (including an associated user device 155), the network manager 180, and one or more of the other electrical devices 102-N.

A protocol 132 can be used for wired and/or wireless communication. Examples of a protocol 132 can include, but are not limited to, Econet, Modbus, profibus, Ethernet, and fiberoptic. One or more of the communication protocols can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols can provide a layer of security to the data transferred within the system 100.

The algorithms 133 can be any formulas, models (e.g., voice recognition models, gesture recognition models, speech recognition models, grammar determination models), and/or other suitable means of manipulating and/or processing data (e.g., communication signals 195). One or more algorithms 133 can be used for a particular protocol 132. In some cases, an algorithm 133 can be used for functions performed by the control engine 106, the timer 110, the dictation module 111, and/or the transcription module 113.

For example, one or more protocols 132 can dictate an action that the control engine 106, the dictation module 111, the transcription module 113, and/or the timer 110 takes when a user 150 or an associated user device 155 is detected in the volume of space 199 (or portion thereof). For example, if a user device 155 is detected in the volume of space 199 (or portion thereof), the control engine 106 can identify the user 150 associated with the user device 155 and instruct the timer 110 to begin counting time. As another example, if a user device 155 is detected in a volume of space 199, the control engine 106 can control the directional scope of hearing of a sensor device 151 in the form of a microphone toward the approximate location of the user device 155 in the volume of space 199.

As still another example, a protocol 132 can instruct the transcription module 113 to highlight certain key words, as provided by the dictation module 111, based on the identification of the user 150 associated with the user device 155 detected in the volume of space 199. Subsequently, a different protocol 132 can be used to direct the transcription module 113 to send at least a portion of transcribed content to the network manager 180 or a user system 155 of a different user 150. As yet another example, one or more protocols 132 can be used to dictate and/or transcribe for foreign languages (e.g., Spanish, French, Italian) and/or particular dialects thereof.

As still another example, a protocol 132 can instruct the control engine 106 to direct the transceiver 124 and/or one or more sensor devices 151 to maintain communication with the user 150 or associated user device 155, and to have the transceiver 124 and/or one or more sensor devices 151 immediately notify the control engine 106 when communication with the user 150 and/or associated user device 155 has ended. In such a case, the control engine 106 can follow one or more protocols 132 to instruct the timer 110 to stop counting time and report the amount of time to the control engine 106. Subsequently, the control engine 106 can follow one or more protocols 132 to report the amount of time that the user 150 spent in the volume of space 199 (or portion thereof) to the network manager 180.

Such protocols 132 can be for a particular user 150 or associated user device 155, a particular group of users 150 or associated user devices 155, or for all known users 150 or associated user devices 155. A protocol 132 can be adjusted at different points in time. Such adjustments can be made, for example, by a user 150, by the network manager 180, and/or automatically by the control engine 106 based on corrections to a period of time previously reported for a particular user 150. As another example, such adjustments can be made by a user 150, by the network manager 180, and/or automatically by the control engine 106 based on corrections to a transcription of audio provided by a particular user 150. As a result, adjustments can be made in the form of language learning, whether in general (e.g., for unusual words or terms) and/or for a particular user 150 (e.g., for a foreign or regional accent, for a foreign (non-English) language).

Stored data 134 can be any data associated with the system 100 (including any components thereof), any dictation taken by the dictation module 111, any transcription made by the transcription module 113, time measured by the timer 110, adjustments to an algorithm 133, threshold values, user preferences, default values, IDs of users 150 and/or user devices 155, results of previously run or calculated algorithms 133, and/or any other suitable data. Such data can be any type of data, including but not limited to historical data for the system 100 (including any components thereof, such as the timer 110, the dictation module 111, the transcription module 113, the control engine 106), present data, and/or future data (e.g., forecasts). The stored data 134 can be associated with some measurement of time derived, for example, from the timer 110.

Examples of a storage repository 130 can include, but are not limited to, a database (or a number of databases), a file system, a hard drive, flash memory, cloud-based storage, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with a user 150 (including an associated user device 155), the network manager 180, and/or any other applicable electrical devices 102-N in the system 100. More specifically, the control engine 106 sends information to and/or receives information from the storage repository 130 in order to communicate with a user 150 (including an associated user device 155), the network manager 180, and/or any other applicable electrical devices 102-N. As discussed below, the storage repository 130 can also be operatively connected to the communication module 108 in certain example embodiments.

In certain example embodiments, the control engine 106 of the controller 104 controls the operation of one or more other components (e.g., the communication module 108, the timer 110, the dictation module 111, the transcription module 113, the transceiver 124) of the controller 104. For example, the control engine 106 can put the communication module 108 in "sleep" mode when there are no communications between the controller 104 and another component (e.g., a user device 155) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin or end tracking a time period, and/or perform another function within the capability of the timer 110. As yet another example, the control engine 106 can direct the transceiver 124 to receive (e.g., using one or more of the antennae 175) communication signals 195 from a user device 155 of a user 150 in the system 100. This example provides another instance where the control engine 106 can conserve power used by the controller 104 and other components of the system 100.

The control engine 106 can determine when to receive one or more communication signals 195 in an attempt to monitor the general location of a user device 155. To conserve energy, the control engine 106 may not constantly receive, directly or indirectly, communication signals 195, but rather only does so at discrete times or under certain conditions (e.g., a door to the volume of space 199 opens, motion in the volume of space 199 is detected). The control engine 106 can be active to receive a communication signal 195 based on one or more of a number of factors, including but not limited to passage of time, the occurrence of an event, instructions from a user 150, and a command received from the network manager 180.

When a communication signal 195 is received from a user device 155, the control engine 106 can identify the particular user 150 associated with the user device 155 and instruct the timer 110 to begin counting time. In addition, or in the alternative, the control engine 106 can convey this information to the dictation module 111 and/or the transcription module 113. If the electrical device 102 is configured to locate the user device 155 (e.g., multiple antennae 175 receiving the communication signal 195 from the user device 155), then the control engine 106, using one or more protocols 132 and/or one or more algorithms 133, can determine the location of the user device 155 and control one or more sensor devices 151 (e.g., microphones) so that the sensor devices 151 are directed toward the user device 155.

Once a user 150 or user device 155 has been identified (e.g., communication signals 195 are received by the transceiver 124 and/or one or more sensor devices 151), the control engine 106 can locate (e.g., by measuring an angle of arrival of the communication signals 195 using one or more sensor devices 151, by measuring the strength (e.g., RSSI) of the communication signals 195 received by one or more sensor devices 151) the user 150 in the volume of space 199 and control one or more sensor devices 151 so that additional communication signals 195 can be received. If there is likely to be another user 150 (e.g., a doctor, another nurse) in the volume of space 199 with the original user 150 (e.g., a nurse), then the control engine 106 can similarly determine the location of the other user 150 in the volume of space 199 and direct the transceiver 124 and/or one or more sensor devices 151 to maintain communication with the other user 150. In such a case, the control engine 106 can also identify the other user 150 (e.g., using voice recognition, receiving a communication signal 195 from an associated user device 155) and have the timer 110 begin tracking another period of time, convey this information to the dictation module 111 and/or the transcription module 113, and/or perform some other action.

In certain example embodiments, once communication signals 195 (e.g., spoken words) broadcast by a user 150 and/or an associated user device 155 has stopped, the control engine 106 of the controller 104 can instruct the timer 110 to stop counting time and report the amount of time to the control engine 106. At that time, the control engine 106 can send the amount of time, the ID of the user 150, and the location (the volume of space 199) to the network manager 180 or another controller for processing in a timekeeping system and/or any other suitable system.

In certain other example embodiments, once communication signals 195 (e.g., spoken words) broadcast by a user 150 has been dictated by the dictation module 111 and/or transcribed by the transcription module 113, the control engine 106 of the controller 104 can send some or all of the results to one or more other users 150. For example, if the original users 150 are a physician and a patient, once the conversation between the two has been dictated and transcribed, the control engine 106 can contact one or more other users 150 (e.g., a pharmacy, an x-ray department) about the relevant portions of the conversation in real time.

In certain example embodiments, the control engine 106 of the controller 104 can determine when a user 150 and/or an associated user device 155 have left the volume of space 199. When this occurs, the control engine 106 can notify the dictation module 111 and/or the transcription module 113 that no new communication signals 195 (e.g., speech) from the user 150 will need to be dictated and transcribed.

The control engine 106 of the controller 104 can also determine when a communication signal 195 that is received should be ignored. For example, if a communication signal 195 is addressable, then the control engine 106 can determine if the communication signal 195 is addressed from a user 150 that is recognized by the electrical device 102-1. If so, the control engine 106 determines the identification of the user 150 based on the user device 155 that sent the communication signal 195 and takes any appropriate action (e.g., initiates the timer 110, stops the timer 110, reports a duration of time measured by the timer 110 to the network manager 180) based on the identification of the user 150. If not, then the control engine 106 ignores the communication signal 195.

In some cases, when the system 100 includes multiple electrical devices 102 in a volume of space 199 in a volume of space 199, each electrical device 102 can have some form of a controller 104. The control engine 106 of one controller 104 can coordinate with the controllers 104 of one or more of the other electrical devices 102 to coordinate, for example, employment of sensor devices 151, dictation by the dictation modules 111, transcription by the transcription modules 113, and measurement of a duration of time by one or more timers 110.

In some cases, the control engine 106 of the electrical device 102-1 can monitor the location of a user device 155 based on one or more communication signals 195 sent by (e.g., originated from, reflected off of) the user device 155. In some cases, the communication signals 195 sent by the user device 155 are in response to one or more communication signals 195 broadcast by the electrical device 102-1. To accomplish this, the control engine 106 obtains a communication signal 195 (e.g., directly from the antennae 175) broadcast by the user device 155 and/or reflected from the user device 155. The protocols 132 and/or algorithms 133 used by the control engine 106 can dictate when and how the control engine 106 operates the optional switch 145. The protocols 132 and/or algorithms 133 can also be used by the control engine 106 to determine which communication signals 195 to ignore.

In certain example embodiments, there is no user device 155 or communication signals 195 involved in controlling operation one or more components of the controller 104, such as the timer 110, the dictation module 111, and/or the transcription module 113. In such a case, one or more sensor devices 151 can be used to identify a user 150 and subsequently cause the control engine 106 to instruct the timer 110 to count elapsed time, to instruct the dictation module 111 to perform dictation, and/or the transcription module 113 to transcribe in accordance with certain example embodiments. For example, a user 150, without a user device 155, can enter a volume of space 199, and a sensor device 151 in the form of a camera can capture an image of the user 150, and the control engine 106 can identify the user 150 based on the captured image, thereby causing the control engine 106 to initiate the timer 110. Similarly, a user 150, without a user device 155, can enter a volume of space 199, and a sensor device 151 in the form of a camera can capture an image of the user 150, and the control engine 106 can identify the user 150 based on the captured image, thereby initiating the dictation module 111 and/or the transcription module 113.

As another example, a user 150, without a user device 155, can enter a volume of space 199, and a sensor device 151 in the form of a camera can capture a specific gesture or series of gestures made by the user 150. In such a case, the control engine 106 can identify the user 150 based on the captured gestures, and subsequently thereby initiate the timer 110. Similarly, a user 150, without a user device 155, can enter a volume of space 199, and a sensor device 151 in the form of a camera can capture a specific gesture or series of gestures made by the user 150. In such a case, the control engine 106 can identify the user 150 based on the captured gestures, thereby initiating the dictation module 111 and/or the transcription module 113.

As still another example, when a user 150 without a user device 155 enters a volume of space 199 and begins emitting communication signals 195 in the form of speech, one or more sensor devices 151 in the form of microphones can capture the sound, and the control engine 106 can compare the voice print to voice prints on file (e.g., stored data 134). When a match has been made, then the control engine 106 can initiate the timer 110, the dictation module 111, and/or the transcription module 113. As yet another example, when a user 150 without a user device 155 enters a volume of space 199 and emits one or more communication signals 195 in the form of uttering a specific phrase, one or more sensor devices 151 in the form of microphones can capture the sound, and the control engine 106 can identify the particular user 150 based on the spoken phrase. When this occurs, the control engine 106 can initiate the timer 110, the dictation module 111, and/or the transcription module 113.

The control engine 106 can provide control, communication, communication signals 195, and/or other signals to a user 150 (including an associated user device 155), the network manager 180, and one or more other electrical devices 102-N. Similarly, the control engine 106 can receive control, communication, communication signals 195, and/or other signals from a user 150 (including a user device 155), the network manager 180, and one or more other electrical devices 102-N. The control engine 106 can communicate with each user 150 (including a user device 155) automatically (for example, based on one or more algorithms stored in the storage repository 130) and/or based on control, communication, and/or other similar signals received from another device (e.g., the network manager 180) using the communication signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102-1. For example, if the power supply 140 of the electrical device 102-1 operates under IEC Standard 62386, and if the electrical device 102-1 is a light fixture, then the power supply 140 can include a digital addressable lighting interface (DALI). In such a case, the control engine 106 can also include a DALI to enable communication with the power supply 140 within the electrical device 102-1. Such an interface can operate in conjunction with, or independently of, the protocols 132 used to communicate between the controller 104 and the users 150 (including the user devices 155), the network manager 180, and any other applicable electrical devices 102-N.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

Using example embodiments, while at least a portion (e.g., the control engine 106, the timer 110) of the controller 104 is always on, the remainder of the controller 104, the other electrical devices 102-N, and/or the network manager 180 can be in sleep mode when they are not being used. In addition, the controller 104 can control certain aspects (e.g., sending communication signals 195 to and/or receiving communication signals 195 from a user 150 or an associated user device 155, operating an optional switch 145) of one or more other electrical devices 102-N in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112 and/or the power supply 140), even more power can be conserved in the operation of the system 100. In addition, using time-synchronized protocols 132 for communication, the data transferred between the controller 104, a user 150 (including a user device 155), the network manager 180, and any other applicable electrical devices 102-N can be secure.

The communication module 108 of the controller 104 determines and implements the communication protocol (e.g., from the protocols 132 of the storage repository 130) that is used when the control engine 106 communicates with (e.g., sends signals to, receives signals from) a user 150 (including an associated user device 155), the network manager 180, and/or any other applicable electrical devices 102-N. In some cases, the communication module 108 accesses the stored data 134 to determine which communication protocol is within the capability of a user device 155 for a communication signal 195 sent by the control engine 106. In addition, the communication module 108 can interpret the communication protocol of a communication (e.g., a communication signal 195) received by the controller 104 so that the control engine 106 can interpret the communication.

The communication module 108 can send data (e.g., protocols 132, stored data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The dictation module 111 of the controller 104 receives communication signals 195 in the form of sound (e.g., spoken words) and converts the communication signals 195 to a text file, an audio file, and/or metadata. In any case, the dictation module 111 can use the timer 110 to generate and insert timestamps into the one or more files created. The timestamps can be inserted into a file to designate, for example, a sound 198 coming from a different direction (e.g., picked up by a sensor device 151 in the form of a microphone), a change in frequency of a communication signal 195 in the form of sound, a change in amplitude of a communication signal 195 in the form of sound, and a pause in a communication signal 195 in the form of sound.

The dictation module 111 can include one or more of any of a number of enhancements in order to more accurately convert a communication signal 195 in the form of sound to one or more files (e.g., text file, audio file, metadata file). As discussed above, any of these files can have timestamps. For example, the dictation module 111 can recognize the accent of a user 150 broadcasting a communication signal 195 in the form of sound and be able to recognize certain words and phrases that would otherwise be difficult to translate or distinguish without familiarity with the accent. As another example, the dictation module 111 can recognize the particular user 150 broadcasting the communication signal 195 in the form of sound and use any user preferences (a form of stored data 134), such as shorthand speech or coded phrases, in dictating the communication signal 195 in the form of sound to one or more files.

The transcription module 113 of the controller 104 receives the one or more files from the dictation module 111 and processes the one or more files for one or more users 150, which can include the user 150 that broadcast the communication signal 195 in the form of sound. Processing the one or more files can involve different functions that depend on one or more of a number of factors, including but not limited to the occupation of the user 150 that broadcast a communication signal 195 in the form of sound, the setting in which the volume of space 199 is located, other users 150 that will receive the one or more files (or portions thereof), preferences of the user 150, and instructions from the user 150.

Processing one or more files by the transcription module 113 can include highlighting certain text, identifying particular users 150 speaking at different times, creating and executing an order (e.g., write a prescription and send the prescription to a pharmacist, send an order to an x-ray department) listed in the text, inserting the one or more files into the records of another user 150 (e.g., a patient), sending billing information to an accounting department based on services provided and described in the one or more files, filing information with an insurance company seeking reimbursement for services provided and described in the one or more files, and any other suitable task that is based on the content and/or context of the one or more files.

The transcription module 113 can process a file generated by the dictation module 111 by analyzing one or more characteristics of the file. Such characteristics can include, but are not limited to, a location in the volume of space 199, signal strength of a communication signal 195 in the form of sound, a sensor device 151 (e.g., a microphone) in use for a particular part of a file, a frequency of a communication signal 195 in the form of sound, an amplitude of a communication signal 195 in the form of sound, and a timestamp. The transcription module 113 can identify specific words as well as "scripts", which attributes certain words or series of words to a particular user 150.

The scripts can be compared with stored data 134 to confirm accuracy. This processing by the transcription module 113 allows for distinguishing prescription orders and other important information from mere conversation. For example, such processing would prevent a patient from prescribing his or her own medication during a conversation with a doctor captured using example embodiments, because the transcription module 113 would only place an order with a pharmacy after recognizing that the doctor, not the patient, said that a certain prescription medication should be used to treat the condition of the patient.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure multiple times simultaneously. The timer 110 can track time periods based on an instruction received from the control engine 106, based on an instruction received from the user 150, based on an instruction programmed in the software for the controller 104, based on some other condition or from some other component, or from any combination thereof.

A time count kept by the timer 110 can be in terms of a period of time (e.g., 10 minutes and 22 seconds). In addition, or in the alternative, a time count kept by the timer 110 can be in terms of a start time (e.g., 10:42:03 a.m.) and an end time (e.g., 10:52:25 a.m.). In some cases, a time count is altered in some way (e.g., truncated, rounded up, rounded down, rounded to fit within a 6 minute increment), which can be based, for example, on a default value, an industry practice, a preference of a user 150, and/or an identification of a user 150.

The timer 110, the dictation module 111, and the transcription module 113 can generally be referred to as supplemental service modules because such modules are dedicated, at least in part, to performing a supplemental service that falls outside the primary operational purpose of the associated electrical device 102-1. If there are any other supplemental services performed by the controller 104 using example embodiments, then the controller 104 can include one or more additional supplemental service modules in addition to, or in the alterative of, the timer 110, the dictation module 111, and/or the transcription module 113.

The power module 112 of the controller 104 provides power to one or more other components (e.g., timer 110, control engine 106) of the controller 104. In addition, in certain example embodiments, the power module 112 can provide power to the power supply 140, the antennae 175, the switch 145, one or more of the sensor devices 151, and/or one or more of the electrical device components 142 of the electrical device 102-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from the power supply 140 and/or a source external to the electrical device 102-1 and generates power of a type (e.g., alternating current, direct current) and level (e.g., 12V, 24V, 120V) that can be used by the other components of the controller 104 (and in some cases one or more of the other components of the electrical device 102-1). In addition, or in the alternative, the power module 112 can be or include a source of power in itself to provide signals to the other components of the controller 104 (and in some cases one or more of the other components of the electrical device 102-1). For example, the power module 112 can include a battery. As another example, the power module 112 can include a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by a user 150 (including an associated user device 155), the network manager 180, and/or any other electrical devices 102-N. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive communication signals 195, which can include control signals. Specifically, the transceiver 124 can be used to transfer data between the controller 104, a user 150 (including an associated user device 155), the network manager 180, and/or any other electrical devices 102-N. The transceiver 124 can use wired and/or wireless technology. The transceiver 124 can be configured in such a way that the control and/or communication signals sent and/or received by the transceiver 124 can be received and/or sent by another transceiver that is part of a user 150 (including an associated user device 155), the network manager 180, and/or any other electrical devices 102-N.

When the transceiver 124 uses wireless technology, any type of wireless technology can be used by the transceiver 124 in sending and/or receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals, including communication signals 195. Such communication protocols can be stored in the protocols 132 of the storage repository 130. Further, any transceiver information for a user 150 (including one or more associated user devices 155), the network manager 180, and/or any other applicable electrical devices 102-N can be part of the stored data 134 (or similar areas) of the storage repository 130.

Optionally, in one or more example embodiments, the security module 128 secures interactions between the controller 104, a user 150 (including an associated user device 155), the network manager 180, and/or any other electrical devices 102-N. More specifically, the security module 128 authenticates communication from software based on security keys verifying the identity of the source of the communication. For example, user software may be associated with a security key enabling the software of the user 150 to interact with the controller 104 of the electrical device 102-1. Further, the security module 128 can restrict receipt of information, requests for information, and/or access to information in some example embodiments.

As mentioned above, aside from the controller 104 and its components, the electrical device 102-1 can include a power supply 140, one or more optional antennae 175, an optional switch 145, one or more sensor devices 151, and one or more electrical device components 142. The electrical device components 142 of the electrical device 102-1 are devices and/or components that are found in the electrical device 142 and/or are used to allow the electrical device 102-1 to operate. An electrical device component 142 can be electrical, electronic, mechanical, or any combination thereof. The electrical device 102-1 can have one or more of any number and/or type of electrical device components 142. For example, when the electrical device 102-1 is a light fixture, examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

In some cases, an electrical device component 142 can be used to provide real-time feedback to a user 150 that is tracking time while the user 150 is in the volume of space 199. Similarly, an electrical device component 142 can be used to provide real-time feedback to a user while dictation by the dictation module 111 and/or transcription by the transcription module 113 is occurring. For example, an electrical device component 142 can be an indicting light that is visible by the user 150 when in the volume of space 199, where the indicting light emits a certain color (e.g., green) and/or behaves in some fashion (e.g., blinks slowly) when the timer 110, the dictation module 111, and/or the transcription module 113 is activated. By contrast, the same indicating light can emit some other color (e.g., red) or behave in some other fashion (e.g., is off) when the timer 110, the dictation module 111, and/or the transcription module 113 is not activated.

The power supply 140 of the electrical device 102-1 provides power to the controller 104 and/or one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from a source (e.g., AC mains) external to the electrical device 102-1 and subsequently sends power to the power module 112 of the controller 104. The power supply can generate power of a type (e.g., alternating current, direct current) and level (e.g., 12V, 24V, 120V) that can be used by the recipients (e.g., the electrical device components 142, the power module 112, one or more of the sensor modules 151, the optional switch 145, one or more of the optional antennae 175) of such power. As stated above, in some cases, the power supply 140 can receive power from the power module 112 of the controller 104. In addition, or in the alternative, the power supply 140 can be or include a source of power in itself. For example, the power supply 140 can include a battery, a localized photovoltaic power system, or some other source of independent power.

As discussed above, the electrical device 102-1 includes one or more optional antennae 175. An antenna 175 is an electrical device that converts electrical power to communication signals 195 (for transmitting) and communication signals 195 to electrical power (for receiving). In transmission, a radio transmitter (e.g., transceiver 124) supplies, through the optional switch 145, an electric current oscillating at radio frequency (i.e. a high frequency alternating current (AC)) to the terminals of the antenna 175, and the antenna radiates the energy from the current as communication signals 195. In reception, an antenna 175 intercepts some of the power of communication signals 195 in order to produce a tiny voltage at its terminals, that is applied through the switch 145 to a receiver (e.g., transceiver 124) to be amplified.

An optional antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse communication signal 195 (often an electromagnetic field wave). Conversely, during reception, the oscillating electric and magnetic fields of an incoming communication signal 195 exert force on the electrons in the body of the antenna 175, causing portions of the body of the antenna 175 to move back and forth, creating oscillating currents in the antenna 175.

In certain example embodiments, an optional antenna 175 can be disposed at, within, or on any portion of the electrical device 102-1. For example, an antenna 175 can be disposed on the housing 103 of the electrical device 102-1 and extend away from the electrical device 102-1. As another example, an antenna 175 can be insert molded into a lens of the electrical device 102-1. As another example, an antenna 175 can be two-shot injection molded into the housing 103 of the electrical device 102-1. As yet another example, an antenna 175 can be adhesive mounted onto the housing 103 of the electrical device 102-1. As still another example, an antenna 175 can be pad printed onto a circuit board within the cavity 101 formed by the housing 103 of the electrical device 102-1. As yet another example, an antenna 175 can be a chip ceramic antenna that is surface mounted. As still another example, an antenna 175 can be a wire antenna.

An antenna 175 can be electrically coupled to the optional switch 145, which in turn is electrically coupled to the transceiver 124. Without the switch 145, an antenna 175 is directly electrically coupled to the transceiver 124. The optional switch 145 can be a single switch device or a number of switch devices arranged in series and/or in parallel with each other. The switch 145 determines which antenna 175 (in the case of multiple antennae 175) or when the lone antenna 175 is coupled to the transceiver 124 at any particular point in time. A switch 145 can have one or more contacts, where each contact has an open state and a closed state (position). In the open state, a contact of the switch 145 creates an open circuit, which prevents the transceiver 124 from delivering a communication signal 195 to or receiving a communication signal 195 from the antenna 175 electrically coupled to that contact of the switch 145. In the closed state, a contact of the switch 145 creates a closed circuit, which allows the transceiver 124 to deliver a communication signal 195 to or receive a communication signal 195 from the antenna 175 electrically coupled to that contact of the switch 145.

In certain example embodiments, the position of each contact of the optional switch 145 is controlled by the control engine 106 of the controller 104. If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

The one or more optional sensor devices 151 of the electrical device 102-1 can include one or more of any type of sensor that measures one or more parameters. Examples of types of sensors of a sensor device 151 can include, but are not limited to, a passive infrared sensor, a camera, a microphone, a photocell, a humidity sensor, a pressure sensor, and a resistance temperature detector. Parameters that can be measured by a sensor of a sensor device 151 can include, but are not limited to, an image, movement (e.g., one or a series of gestures), an image, sound (e.g., speech, a voice print, specific phrases), facial recognition, pressure, ambient light, infrared light, temperature, humidity, and ambient temperature. The parameters measured by the sensors of a sensor device 151 can be used by the control engine 106 to operate and control one or more other components (e.g., the timer 110, the dictation module 111, the transcription module 113, the transceiver 124) of the controller 104 and/or one or more other components (e.g., another sensor device 151) of the electrical device 102-1. A sensor device 151 can receive power and/or control signals from the power source 140, the power module 112 of the controller 104, and/or one or more other sources of power. In some cases, a sensor device 151 can be used in conjunction with the operation of one or more electrical device components 142.

In some cases, a sensor device 151 can be an integrated sensor device 151, which can be considered a type of electrical device 102. An integrated sensor device 151 has both the ability to sense and measure at least one parameter and the ability to independently communicate with another component (e.g., a user device 155, the network manager 180, the controller 104 of the electrical device 102-1). The communication capability of an integrated sensor device 151 can include one or more communication devices that are configured to communicate with one or more other components of the system 100. For example, an integrated sensor device 151 can include a sensor that is a passive infrared (PIR) sensor, a transceiver that sends and receives signals (e.g., communication signals 195) using Zigbee, a receiver that receives signals (e.g., communication signals 195) using BLE, and a receiver that actively receives IR signals. In such a case, the PIR sensor measures IR light radiating from a user 150 and/or an associated user device 155 in its field of view, often for the purpose of detecting motion or occupancy.

Each integrated sensor device 151 can use one or more of a number of communication protocols. This allows an integrated sensor device 151 to communicate with one or more components of the system 100. The communication capability of an integrated sensor device 151 can be dedicated to the sensor device 151, shared with one or more other sensor devices 151 that are not integrated, and/or shared with the controller 104 of the electrical device 102-1. When the system 100 includes multiple integrated sensor devices 151, one integrated sensor device 151 can communicate, directly or indirectly, with one or more of the other integrated sensor devices 151 in the system 100.

If the communication capability of an integrated sensor device 151 is dedicated to the integrated sensor device 151, then the integrated sensor device 151 can include one or more components (e.g., memory 122, a storage repository 130, a transceiver 124, a communication module 108), or portions thereof, that are substantially similar to the corresponding components described above with respect to the controller 104. A sensor device 151 (whether integrated or not) can be associated with the electrical device 102-1 and/or another electrical device 102-N in the system 100. A sensor device 151 (whether integrated or not) can be located within the housing 103 of the electrical device 102-1, disposed on the housing 103 of the electrical device 102-1, or located outside the housing 103 of the electrical device 102-1.

In certain example embodiments, a sensor device 151 (whether integrated or not) can include an energy storage device (e.g., a battery) that is used to provide power, at least in part, to some or all of the sensor device 151. In such a case, the energy storage device can be the same as, or independent of, an energy storage device or other power supply 140 of the electrical device 102-1. The optional energy storage device of the sensor module 151 can operate at all times or when the power supply of the electrical device 102-1 is interrupted. The controller 104 can provide the functionality of these components used by the sensor device 151. Alternatively, the sensor device 151 can be integrated and include, either on its own or in shared responsibility with the controller 104, one or more of the components of the controller 104. In such a case, the integrated sensor device 151 can correspond to a computer system as described below with regard to FIG. 2. An example of an integrated sensor device is shown below with respect to FIG. 8.

Figure 2:
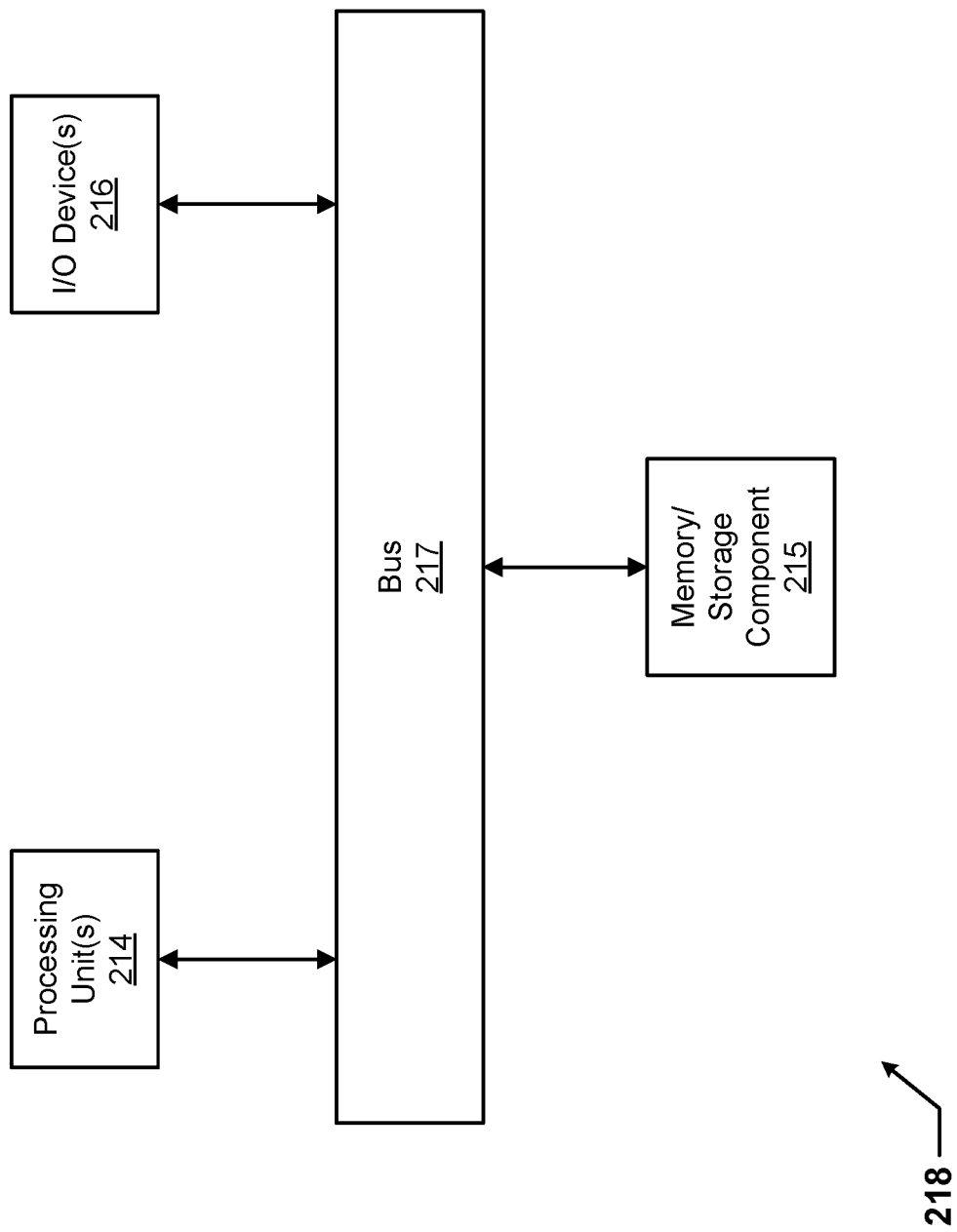
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, computing device 218 can be implemented in the electrical device 102 of FIG. 1 in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
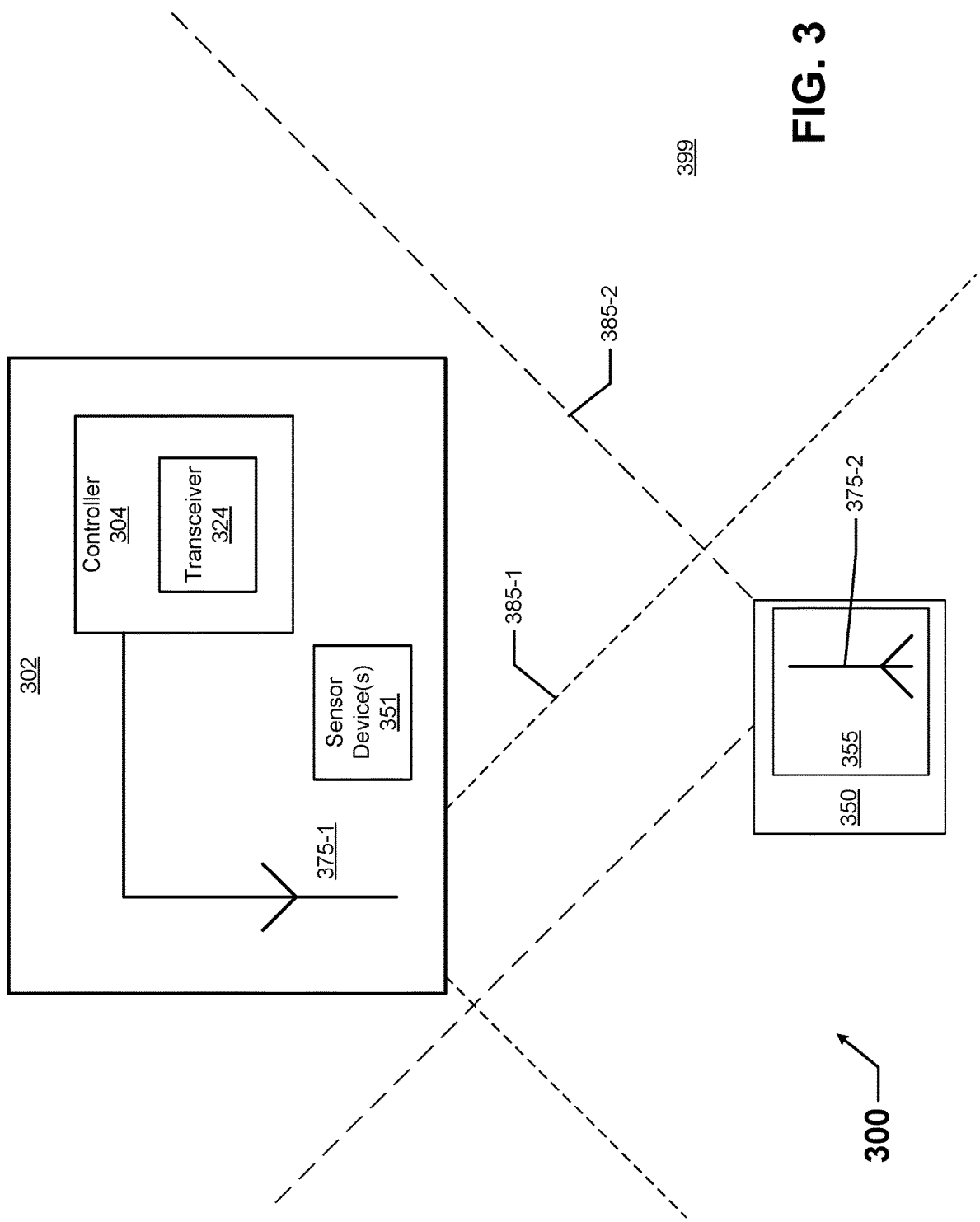
FIG. 3 shows a system for transceiving communication signals in a volume of space in accordance with certain example embodiments.

FIG. 3 shows a system 300 for transceiving communication signals in a volume of space 399 in accordance with certain example embodiments. Referring to FIGS. 1-3, located in the volume of space 399 of FIG. 3 is an electrical device 302 having a controller 304 (including a transceiver 324), one or more sensor devices 351, and an antenna 375-1. Also located in the volume of space 399 is a user device 355 of a user 350, where the user device 355 has an antenna 375-2. As discussed above with respect to FIG. 1, the volume of space 399 can be of any size and/or in any location. For example, the volume of space 399 can be a room in an office building.

As shown in FIG. 3, the antenna 375-1 of the electrical device 302 can be located in the volume of space 399. Alternatively, the antenna 375-1 can be located on another electrical device (e.g., another light fixture, on a thermostat, on a clock/radio, on a television). In any case, it is possible that the antenna 375-1 can be located outside the volume of space 399, as long as the RF signals (e.g., communication signals 195) sent by the antenna 375-2 of the user device 355 of the user 350 are received by the antenna 375-1 of the electrical device 302.

The antenna 375-1, when combined with the transceiver 324 of the controller 304, has a communication range 385-1. The communication range 385-1 defines a maximum volume within the volume of space 399 in which the transceiver 324 can send and receive signals. While not shown in FIG. 3, each sensor device 351 can also have its own communication range. The antenna 375, the transceiver 324, the controller 304, the one or more sensor devices 351, and the electrical device 302 can be substantially the same as the antenna 175, the transceiver 124, the controller 104, the one or more sensor devices 151, and the electrical device 102-1 of FIG. 1.

The user device 355 of FIG. 3 includes antenna 375-2, which can be substantially the same as the user device 155 and the antenna 175 discussed above with respect to FIG. 1. In some cases, the user device 355 can also include a controller, which can perform at least some of the capabilities of the controller 104 described above. In some cases, the user device 355 of the user 350 can have a communication range 385-2, which defines a maximum volume within the volume of space 399 in which the user device 355 can send and/or receive signals.

If the communication range 385-1 of the controller 304 (and/or the communication range of a sensor device 351) of the electrical device 302 intersects with the communication range 385-2 of the user device 355, then the controller 304 (and/or the sensor device 351) and the user device 355 can transmit signals between each other. Conversely, if the communication range 385-1 of the controller 304 (and/or the communication range of a sensor device 351) of the electrical device 302 fails to intersect the communication range 385-2 of the user device 355, then the controller 304 (and/or the sensor device 351) and the user device 355 fail to communicate with each other.

Figure 4:
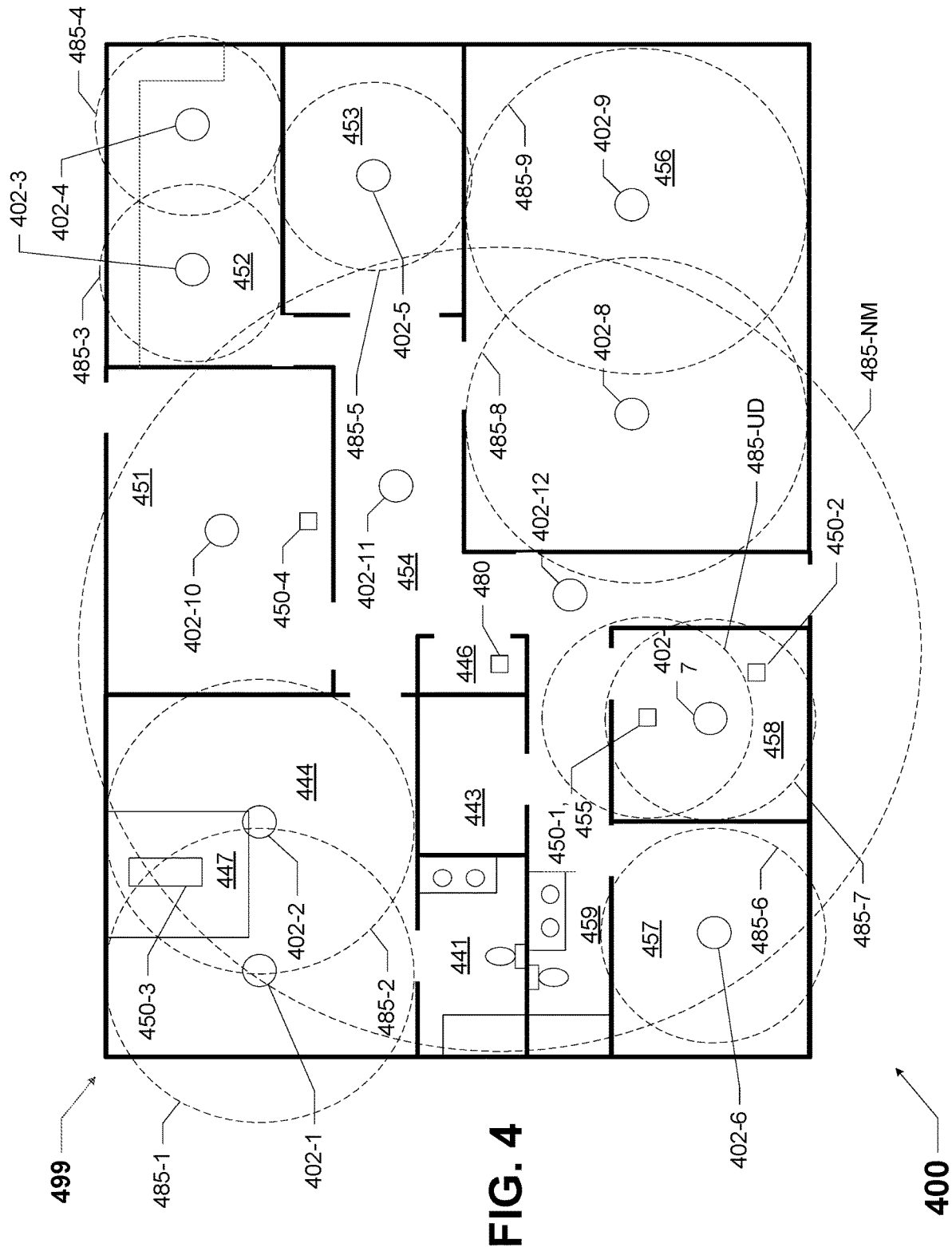
FIGS. 4 through 7 show a system for providing automated supplemental services using multiple electrical devices in part of a hospital wing in accordance with certain example embodiments.

FIGS. 4 through 7 show a system for performing automated supplemental services using multiple electrical devices in a volume of space 499 disposed in part of a hospital in accordance with certain example embodiments. Specifically, FIGS. 4 through 7 show the part of the volume of space 499 in which multiple electrical devices 402 are used to automatically track time in accordance with certain example embodiments. Referring to FIGS. 1 through 7, the system 400 of FIG. 4 is set in the part of the hospital, which includes a nurse's station 451, a lab 452, a private office 453 (e.g., of the resident physician), a hallway 454, a surgical room 456, a first short-term patient room 457, a second short-term patient room 458, a bathroom 459, an IT room 446, a long-term patient room 444 having a bathroom 441, and a supply closet 443. While each room of the part of the volume of space 499 (the hospital) has furniture and other objects, most of those objects are not shown here for the sake of simplicity. The furniture shown in FIG. 4 includes a bed 447 in the long-term patient room 444.

There are a number of users 450 shown in FIG. 4 at various locations throughout the volume of space 499. User 450-1 is a nurse located in the second short-term patient room 458 with user 450-2, who is a patient. User 450-3 is another patient lying in the bed 447 in the long-term patient room 444, and user 450-4 is still another patient in the nurse's station 451. User 450-1 includes a user device 455, while none of the other users 450 of FIG. 4 have a user device.

There are also a number of electrical devices 402 positioned throughout the volume of space 499. For example, as shown in FIG. 4, electrical device 402-1 and electrical device 402-2 are light fixtures that are disposed on the ceiling in the long-term patient room 444. Electrical device 402-3 and electrical device 402-4 are light fixtures disposed on the ceiling of the lab 452. Electrical device 402-5 is a light fixture disposed on the ceiling of the private office 453. Electrical device 402-6 is a light fixture disposed on the ceiling of the first short-term patient room 457. Electrical device 402-7 is a light fixture disposed on the ceiling of the second short-term patient room 458.

Electrical device 402-8 and electrical device 402-9 are light fixtures disposed on the ceiling of the surgical room 456. Electrical device 402-10 is a light fixture disposed on the ceiling of the nurse's station 451. Electrical device 402-11 and electrical device 402-12 are light fixtures disposed on the ceiling of the hallway 454. There are a number of other electrical devices (e.g., electrical outlets, other light fixtures, smoke detectors, $CO_2$ monitors, clocks, computers, printers, medical devices) that are disposed in the rooms of the part of the hospital but are not shown in FIG. 4 for the sake of simplicity. There is also a network manager 480 disposed in the IT room 466.

Most of the electrical devices 402 shown in FIG. 4 can be substantially similar to the electrical device 102 of FIG. 1, including its components such as the controller 104. Also, the network manager 480, each user 450, and each user device 455 of FIG. 4 are substantially similar to the network manager 180, each user 150, and each user device 155 of FIG. 1. In other words, each electrical device 402, the network manager 480, the user device 455, and each user 450 of FIG. 4 is capable of communicating with each other provided that they have overlapping communication ranges 485. The communication ranges 485 of the systems of FIG.

4 through 7 are substantially the same as the communication ranges 385 of the system 300 of FIG. 3.

Electrical device 402-1 has communication range 485-1. Electrical device 402-2 has communication range 485-2. Electrical device 402-3 has communication range 485-3. Electrical device 402-4 has communication range 485-4. Electrical device 402-5 has communication range 485-5. Electrical device 402-6 has communication range 485-6. Electrical device 402-7 has communication range 485-7. Electrical device 402-8 has communication range 485-8. Electrical device 402-9 has communication range 485-9. Electrical device 402-10, electrical device 402-11, and electrical device 402-12 have no communication range, either because those electrical devices 402 do not have a transceiver (e.g., transceiver 124), or because the transceiver in those electrical devices 402 has been disabled. The network manager 480 has communication range 485-NM, and user device 455 has communication range 485-UD.

In this case, communication range 485-1 of electrical device 485-1 overlaps with communication range 485-2 of electrical device 402-2 and communication range 485-NM of the network manager 480. Communication range 485-2 of electrical device 485-2 overlaps with communication range 485-1 of electrical device 402-1 and communication range 485-NM of the network manager 480.

Communication range 485-3 of electrical device 485-3 overlaps with communication range 485-4 of electrical device 402-4 and communication range 485-NM of the network manager 480. Communication range 485-4 of electrical device 485-4 overlaps with communication range 485-3 of electrical device 402-3 and communication range 485-5 of electrical device 402-5. Communication range 485-5 of electrical device 485-5 overlaps with communication range 485-NM of the network manager 480, communication range 485-4 of electrical device 402-4, and communication range 485-9 of electrical device 402-9.

Communication range 485-6 of electrical device 485-6 overlaps with communication range 485-NM of the network manager 480. Communication range 485-7 of electrical device 485-7 overlaps with communication range 485-NM of the network manager 480. Communication range 485-8 of electrical device 485-8 overlaps with communication range 485-NM of the network manager 480 and communication range 485-9 of electrical device 402-9. Communication range 485-9 of electrical device 485-9 overlaps with communication range 485-NM of the network manager 480, communication range 485-5 of electrical device 402-5, and communication range 485-8 of electrical device 402-8.

Communication range 485-NM of the network manager 480 overlaps with communication range 485-1 of electrical device 402-1, communication range 485-2 of electrical device 402-2, communication range 485-3 of electrical device 402-3, communication range 485-5 of electrical device 402-5, communication range 485-6 of electrical device 402-6, communication range 485-7 of electrical device 402-7, communication range 485-8 of electrical device 402-8, communication range 485-9 of electrical device 402-9, and communication range 485-UD of user device 455. Further, electrical device 402-10, electrical device 402-11, and electrical device 402-12 are also within communication range 485-NM of the network manager 480.

Communication range 485-UD of user device 455 overlaps with communication range 485-7 of electrical device 402-7 and communication range 485-NM of the network manager 480. As set out in FIG. 4, user 450-1, user device 455, and user 450-2 are located within communication range 485-1 of electrical device 485-1, communication range 485-2 of electrical device 402-2, and communication range 485-NM of the network manager 480. User 450-3 is located within communication range 485-1 of electrical device 485-1, communication range 485-2 of electrical device 402-2, and communication range 485-NM of the network manager 480. User 450-4 is located in communication range 485-NM of the network manager 480.

The communication range 485 of an electrical device 402 and/or the user device 455 in FIG. 4 can be made larger or smaller, and these adjustments can be made by, for example, a user (e.g., user 450), the network manager (e.g., network manager 480), or automatically by a controller. Given the relative orientation of the electrical devices 402, the network manager 480, the users 450, and the user device 455 in FIG. 4, the user device 455 can communicate with electrical device 402-7 so that electrical device 402-7 receives one or more communication signals (e.g., communication signal 195) from the user device 455.

In such a case, the controller of the electrical device 402-7 recognizes the user 450-1 associated with the user device 455, instructs the timer (e.g., timer 110) of the electrical device 402-7 to begin counting time, and continues communication with the user 450-1 and/or associated user device 455 until the user 450-1 and associated user device 455 moves outside the communication range 485-7 of electrical device 402-7 (in other words, until the user 450-1 leaves the second short-term patient room 458). When the user 450-1 and associated user device 455 moves outside the communication range 485-7 of electrical device 402-7, the control engine of the controller of electrical device 402-7 instructs the timer to stop counting time and to report the time.

In some alternative embodiments, a strength of a communication signal (e.g., communication signal 195) is measured by the transceiver of the electrical device 402, and that strength of the communication signal is compared to a threshold value. If the strength of the communication signal falls below the threshold value, then the timer of the electrical device 402 is directed to stop counting, even though the user device 455 is still within the communication range 485 of the electrical device 402.

In yet other alternative embodiments, if the user device 455 is within the communication range 485 of multiple electrical devices 402, and if the adjacent electrical devices 402 are not configured to collaborate with each other (e.g., there are multiple patients that a user 450 who is a nurse is calling on), then the electrical device 402 that is receiving the highest signal strength of a communication signal (e.g., evaluated by the network manager or a controller of one of the electrical devices 402) instructs its timer to track time, while the timers of the other electrical devices 402 remain inactive. When the electrical device 402 that had been receiving the highest signal strength is no longer receiving the highest signal strength relative to at least one other adjacent electrical device 402 (e.g., as determined by the network manager 480, which is in direct or indirect communication with all of the electrical devices 402), than its timer stops tracking time. In any case, when the control engine of the controller of electrical device 402-7 then sends the time that user 450-1 spent in the second short-term patient room 458 to the network manager 480 for processing in some other system (e.g., a timekeeping system, an interface with an insurance provider, an accounting system).

There may be other ways in which a timer of an electrical device 402 can be activated (e.g., start tracking time) and/or deactivated (e.g., stop tracking time). For example, the transceiver can receive communication signals (e.g., communication signals 195) from the user device 455 on some periodic basis (e.g., every 5 seconds, every 10 cycles), and the timer of the electrical device 402 counts time until some amount of time (e.g., 10 seconds, one second) has elapsed since the most recent communication signal was received.

Figure 5:
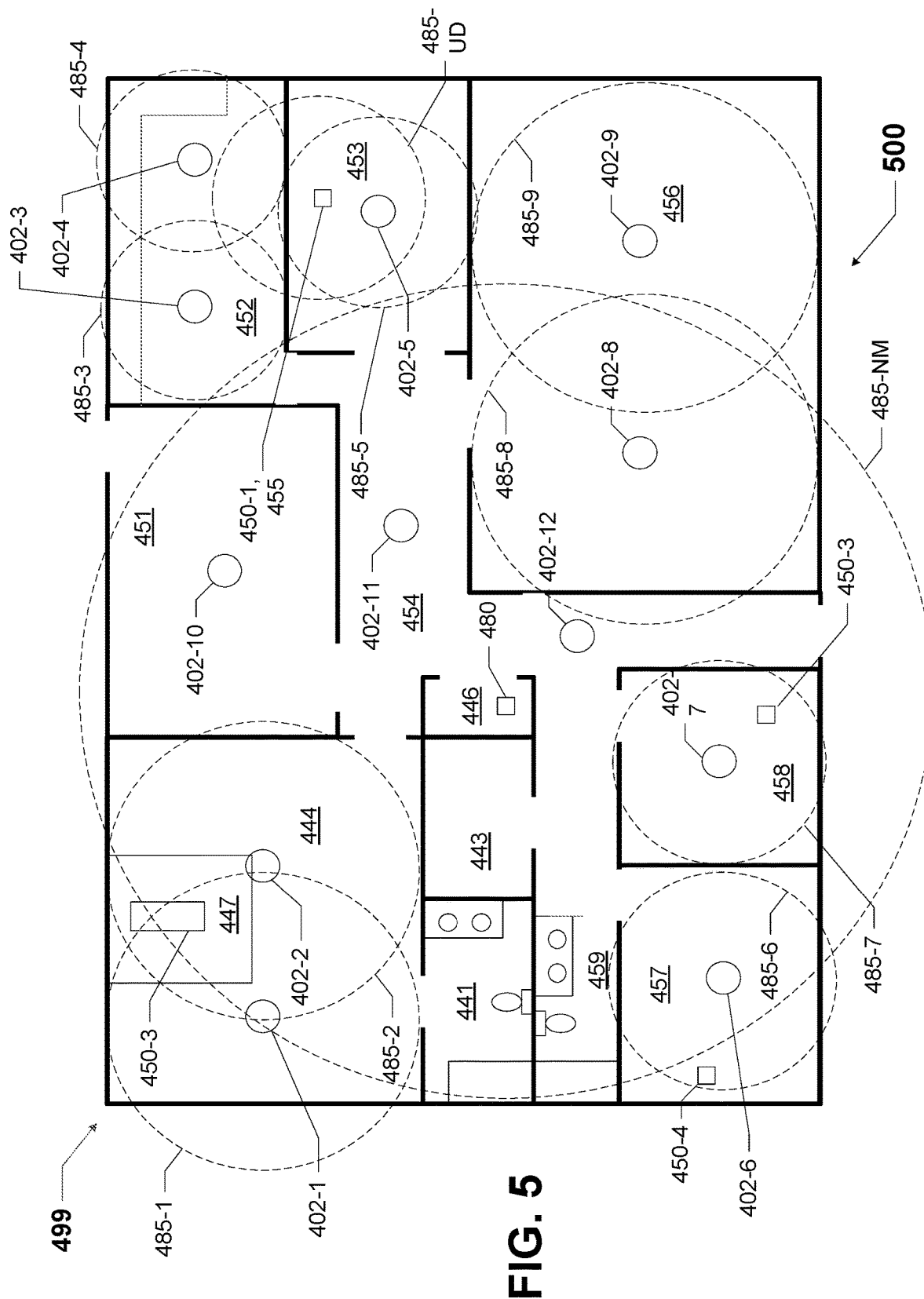

When the user 450-1 has finished performing duties in the second short-term patient room 458, the example proceeds to FIG. 5. The controller of the electrical device 402-7 in the second short-term patient room 458 can determine that the user 450-1 and/or the user device 455 has left the second short-term patient room 458 in one or more of a number of ways. For example, the transceiver of the controller of the electrical device 402-7 can maintain communication (e.g., using communication signals 195) with the user device 455 over time (e.g., continually, every minute), and when the communication stops, the controller determines that the user device 455 (and so also the user 450-1 associated with the user device 455) has left the second short-term patient room 458.

As another example, the controller of the electrical device 402-7 can determine that certain sensor devices 151 (e.g., microphones) of the electrical device 402-7 have not measured any parameters (e.g., sound) related to the user 450-1 for some period of time (e.g., for the past minute, for the past 30 seconds), causing the controller of the electrical device 402-7 to instruct the timer (e.g., timer 110) to stop counting time. As yet another example, if the controller (or some portion thereof, such as a sensor 151) can recognize the particular sound (e.g., voice) of user 450-1, then the controller of the electrical device 402-7 can determine that if the sensor devices 151 (e.g., microphones) of the electrical device 402-7 have not detected that particular sound in the second short-term patient room 458 for some period of time (e.g., for the past minute, for the past 30 seconds), then the controller will instruct the timer (e.g., timer 110) to stop counting time and report the time to the controller of the electrical device 402-7.

As still another example, there may be certain key words (e.g., "start", "begin", "stop", "terminate", "fin") or phrases (e.g., "start me up", "John Doe reporting", "that's all folks", "stop timer") that can be saved (e.g., by default, by the user 450-1) as stored data (e.g., stored data 134) which, when spoken (e.g., by anyone, only by the user 450-1) and received as sound (as measured by a microphone or other type of sensor 151), can trigger the controller of the electrical device 402-7 to control the timer (e.g., timer 110) of the electrical device 402-7 according to the verbal instruction. Similarly, other words or phrases (e.g., "pause timer") can be used to merely pause, rather than stop, the time count of the timer. In such a case, other words or phrases (e.g., "resume timer") can be used to resume the time count of the timer.

In additional or alternative embodiments, when the controller of the electrical device 402-7 recognizes the user 450-1 associated with the user device 455, the controller activates (e.g., turns on, manipulates to establish a direction toward the user device 455) one or more sensor devices (e.g., sensor device 151) in the form of microphones of electrical device 402-7, and initiates the dictation module (e.g., dictation module 111) to capture communication signals (e.g., communication signals 195) in the form of spoken words broadcast by the user 450-1 and, in some cases, user 450-2. If such communication signals 195 detected by the microphones are not deemed by the controller to be of optimal quality, then the controller can adjust one or more of the sensor devices to improve the quality of the sound.

For example, when user 450-1 and user 450-2 engage in a conversation (e.g., as user 450-1 diagnoses and treats user 450-2), with the dictation module already initiated, the conversation is dictated by the dictation module into one or more files. In addition, the transcription module (e.g., transcription module 113) of electrical device 402-7 can transcribe the text in the one or more files generated by the dictation module. This transcription by the transcription module can occur in real time (as the one or more files are being created and added to) or at some point in time after the one or more files have been created and saved. Alternatively, if the dictation module is not activated or not part of the controller, the transcription module can transcribe based in real-time using only the communication signals (in this case, spoken words) received by the sensor devices (e.g., microphones).

When the diagnosis and treatment of user 450-2 by user 450-1 is complete, the example proceeds to FIG. 5. The controller of the electrical device 402-7 in the second examination room 458 can determine that the need for further dictation and/or transcription is over in one or more of a number of ways. For example, the transceiver of the controller of the electrical device 402-7 can maintain communication (e.g., using communication signals 195) with the user device 455 over time (e.g., continually, every minute), and when the communication stops, the controller determines that the user device 455 (and so also the user 450-1 associated with the user device 455) has left the second examination room 458.

As another example, the controller of the electrical device 402-7 can determine that the sensor devices (such as microphones) of the electrical device 402-7 have not received any communication signals (e.g., spoken words) for some period of time (e.g., for the past minute, for the past 30 seconds), causing a pause in the activity of the dictation module and/or the transcription module of the controller of the electrical device 402-7. As yet another example, if the controller (or some portion thereof, such as the dictation module) can recognize the particular sound (e.g., voice recognition) of user 450-1, then the controller of the electrical device 402-7 can determine that if the microphones of the electrical device 402-7 have not received communication signals (in this case, spoken words) from user 450-1 for some period of time (e.g., for the past minute, for the past 30 seconds), then the controller should pause the activity of the dictation module and/or the transcription module of the controller of the electrical device 402-7.

As still another example, there may be certain key words (e.g., "stop", "terminate", "fin") or phrases (e.g., "that's all folks", "stop dictation") that can be saved (e.g., by default, by the user 450-1) as stored data (e.g., stored data 134) which, when spoken (e.g., by anyone, only by the user 450-1) and received as communication signals, can trigger the controller of the electrical device 402-7 to stop the activity of the dictation module and/or the transcription module of the controller of the electrical device 402-7. Similarly, other words or phrases (e.g., "pause dictation") can be used to merely pause, rather than stop, dictations. In such a case, other words or phrases (e.g., "resume dictation") can be used to resume dictation that has been paused.

The system 500 of FIG. 5 is identical to the system 400 of FIG. 4, except that user 450-1 and associated user device 455 have moved from the second short-term patient room 458 to the private office 453. At this point, perhaps by a method described in one of the examples in the three preceding paragraphs, the controller of electrical device 402-7 has stopped the timer of electrical device 402-7, completed the dictation of electrical device 402-7, and/or completed the transcription of electrical device 402-7. The resulting time count for user 450-1, the resulting transcription, and/or the resulting dictation can be recorded (e.g., saved as stored data 134 in the storage repository 130) and distributed (e.g., sent to a timekeeper, sent to a consulting physician, sent to a finance department, sent to an insurance company) as appropriate (e.g., by default, based on the content of the text file, at the direction of user 450-1, based on insurance information for user 450-2) by the controller of electrical device 402-7.

Upon entering the private office 453, the user device 455 of the user 450-1 can communicate with the transceiver of electrical device 402-5. When this occurs, the controller of electrical device 402-5 can initiate a time count by the timer (e.g., timer 110) of electrical device 402-5, initiate a dictation by the dictation module (e.g., dictation module 111) of electrical device 402-5, and/or initiate a transcription by the transcription module (e.g., transcription module 113) of electrical device 402-5.

For dictation and/or transcription, the controller of electrical device 402-5 can activate (e.g., turn on, manipulate to establish a direction toward the user device 455) one or more of the sensor devices (e.g., microphones) of electrical device 402-5, and initiate the dictation module and/or the transcription module to capture communication signals (e.g., spoken words) broadcast by the user 450-1. If the communication signals detected by the sensor devices are not deemed by the controller to be of optimal quality, then the controller can readjust one or more of the sensor devices to improve the quality of the sound.

The controller of electrical device 402-5, using the transceiver (e.g., transceiver 124) and/or one or more sensor devices (e.g., sensor devices 151) of electrical device 402-5, continues to verify the presence of user 450-1 and/or user device 455 in the private office 453. If at some point in time the controller of electrical device 402-5 determines that user 450-1 and/or user device 455 is no longer in the private office 453, then the controller instructs the timer, the dictation module, and/or the transcription module of electrical device 402-5 to stop.

Figure 6:
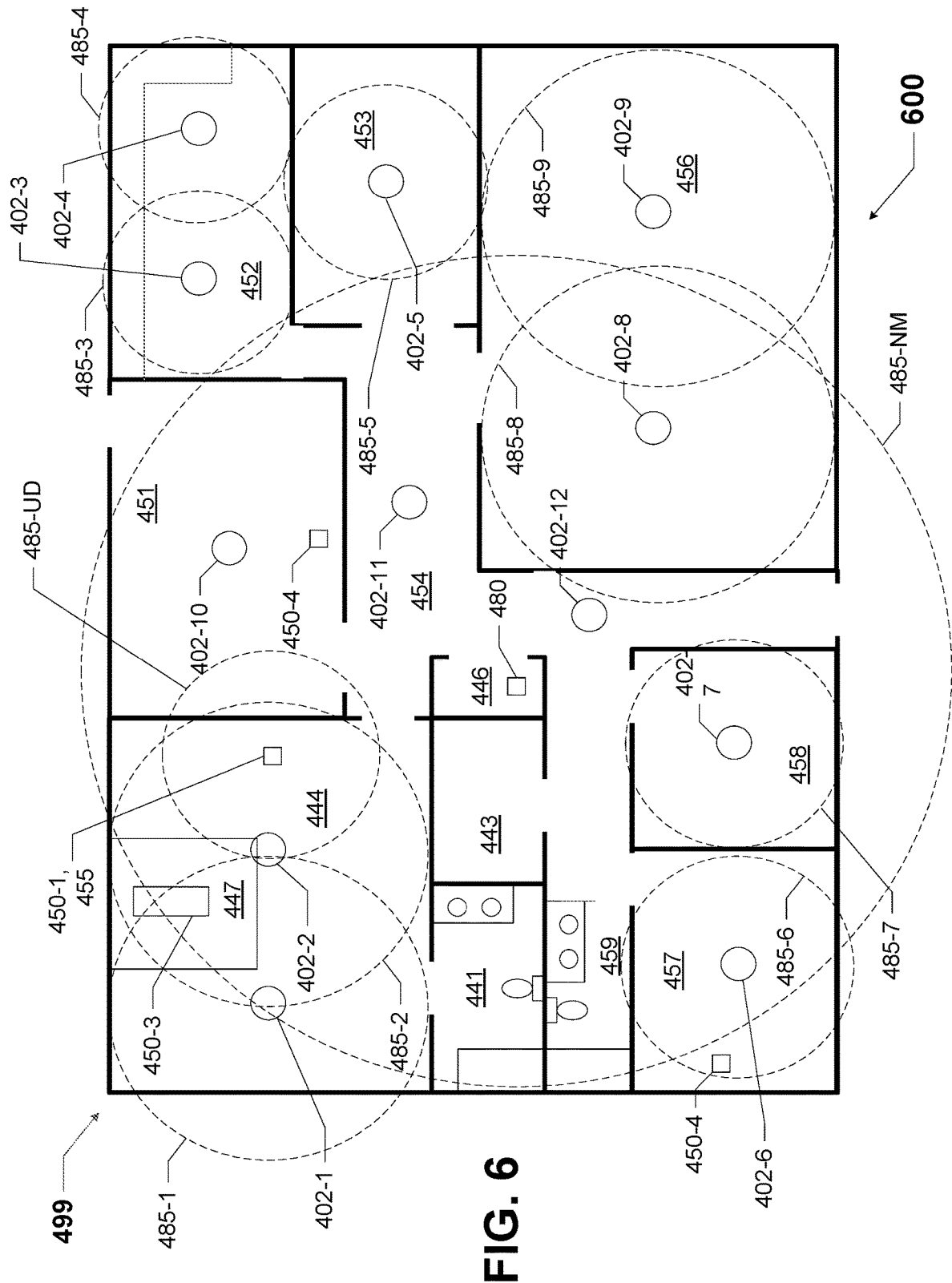

In FIG. 6, which captures a point in time subsequent to the point in time captured in the system 500 of FIG. 5, the system 600 is identical to the system 500 of FIG. 5, except that user 450-1 and associated user device 455 have moved from the private office 453 to the long-term patient room 444. Also, user 450-2 has left the volume of space 499. At this point, the timer of electrical device 402-5 has completed the time count for user 450-1 being in the private office 453, and the controller of electrical device 402-5 has distributed the information as appropriate.

Upon entering the long-term patient room 444, the user device 455 of the user 450-1 can communicate with the transceiver and/or one or more sensor devices of electrical device 402-2. When this occurs, the controller of electrical device 402-2 can instruct the timer of electrical device 402-2 to initiate a time count, initiate a dictation by the dictation module (e.g., dictation module 111) of electrical device 402-2, and/or initiate a transcription by the transcription module (e.g., transcription module 113) of electrical device 402-2. The controller of electrical device 402-2 can then use the transceiver and/or sensor devices of electrical device 402-2 to confirm the continued presence of user 450-1 in the long-term patient room 444.

Also, since the long-term patient room 444 is relatively large compared to the size of the communication range 485-2 of electrical device 402-2, the controller of electrical device 402-2 can communicate with (either directly or through the network manager 480) the controller of electrical device 402-1 to coordinate the time count for user 450-1 being present in the long-term patient room 444. Similarly, the controllers of electrical device 402-1 and electrical device 402-2 can coordinate efforts to capture continuous dictation and/or transcription in the long-term patient room 444. In this way, if user 450-1 (including user device 455) traverses to a part of the long-term patient room 444 that is not covered by the communication range 485-2 of electrical device 402-2 and/or by the sensor devices of electrical device 402-2, then the transceiver and/or sensor devices of electrical device 402-1 can be used to provide that which the transceiver and/or sensor devices of electrical device 402-2 fail to detect, or to supplement that which the transceiver and/or sensor devices of electrical device 402-2 detect. In this way, the time count, transcription, and/or dictation is not interrupted until user 450-1 has truly left the long-term patient room 444.

Alternatively, if there are two patients (user 450-3 and another user not shown in FIG. 6) in the long-term patient room 444, where each patient has her or his own bed, then electrical device 402-1 and electrical device 402-2 may keep separate time counts, dictation, and/or transcription. In such a case, one timer, dictation module, and/or transcription module may be activated over another based on one or more of a number of factors, such as relative strength of the communication signal received by each electrical device 402.

Figure 7:
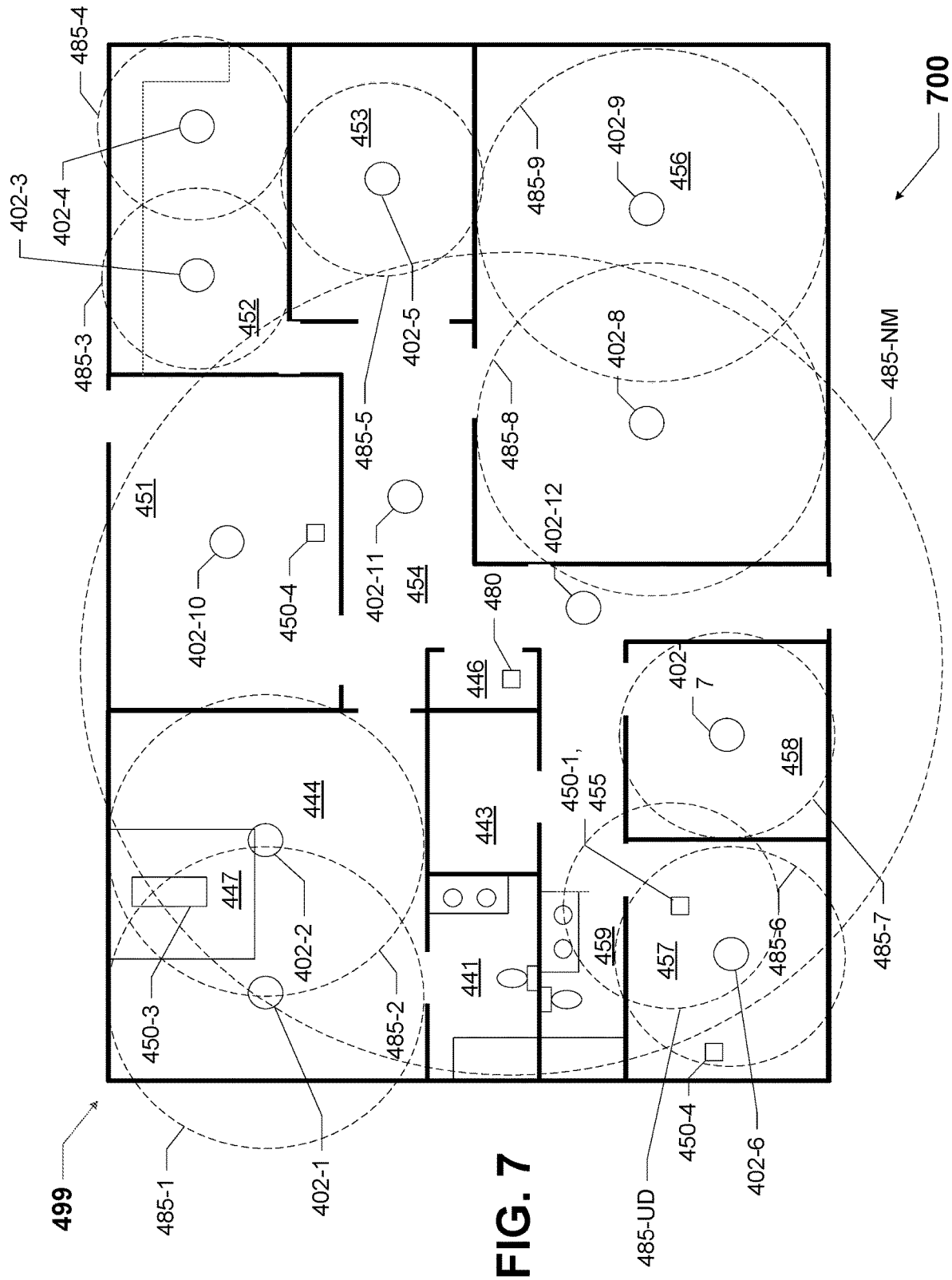

In FIG. 7, which captures a point in time subsequent to the point in time captured in the system 600 of FIG. 6, the system 700 is identical to the system 600 of FIG. 6, except that user 450-1 and associated user device 455 have moved from the long-term patient room 444 to the first short-term patient room 457. At this point, the controller of electrical device 402-2 and/or the controller of electrical device 402-1 has collected the time count from one or both timers, the transcription from one or both transcription modules, and/or the dictation from one or both dictation modules. The resulting information has then been subsequently distributed as appropriate.

Upon entering the first short-term patient room 457, the user device 455 of the user 450-1 can communicate with the transceiver and/or one or more sensor devices of electrical device 402-6. When this occurs, the controller of electrical device 402-6 can instruct the timer of electrical device 402-6 to begin a time count, initiate a dictation by the dictation module (e.g., dictation module 111) of electrical device 402-6, and/or initiate a transcription by the transcription module (e.g., transcription module 113) of electrical device 402-6. The controller of electrical device 402-6 can then use the transceiver and/or sensor devices of electrical device 402-6 to confirm the continued presence of user 450-1 in the first short-term patient room 457.

After the controller of electrical device 402-6 loses communication with and/or detection of user 450-1, the controller of electrical device 402-6 instructs the timer of electrical device 402-6 to stop the time count, instructs the dictation module of electrical device 402-6 to stop the dictation, and instructs the transcription module of electrical device 402-6 to stop the transcription. The controller of electrical device 402-6 then stores the time count, dictation, and/or transcription, and subsequently distributes the resulting information as appropriate.

In one or more example embodiments, multiple electrical devices (e.g., light fixtures) use transceivers and/or sensor devices to receive communication signals (e.g., RF signals)

or to otherwise detect and identify a particular user, sometimes with a user device, in a volume of space. Once the user or user device has been detected and the user identified, example embodiments instruct a timer to begin a time count, a dictation module to begin a dictation, a transcription module to begin a transcription, and/or some other module to begin some other supplemental service that is unrelated to the primary purpose of the electrical device (e.g., light fixture). Simultaneously, example embodiments use the transceiver and/or sensor devices to determine when the user is no longer in the volume of space. At that point in time, example embodiments instruct the timer to stop the time count, the dictation module to stop the dictation, the transcription module to stop the transcription, and/or some other module to stop some other supplemental service. The resulting information is then stored in association with the user and distributed to other users and/or systems, as appropriate.

As discussed above, example embodiments can also be used for automatically performing one or more other supplemental services aside from tracking time of a user 450, dictating speech of a user 450, and/or transcribing speech of a user 450. For example, a timer of an electrical device 402 and/or a timer of a user device 455 can be used to track an amount of time that a piece of equipment in a volume of space is operating while the user 450 is in the volume of space. This can be accomplished manually by a user 450 or automatically, for example with the assistance of one or more sensor devices (similar to the sensor devices 151 discussed above) that are associated with the piece of equipment. This operating time of the piece of equipment can be sent to the network manager or other type of master controller, which accounts for all of the time that the piece of equipment is operating based on reports from multiple users 450 and/or electrical devices 402. In such a case, the network manager or other type of master controller can determine when certain functions (e.g., maintenance, cleaning, replacement) should be performed on the piece of equipment and schedule such functions to be performed. In some cases, the controller (e.g., controller 104) of an electrical device 402 can include one or more additional modules that are dedicated to performing one or more the additional supplemental services.

Figure 8:
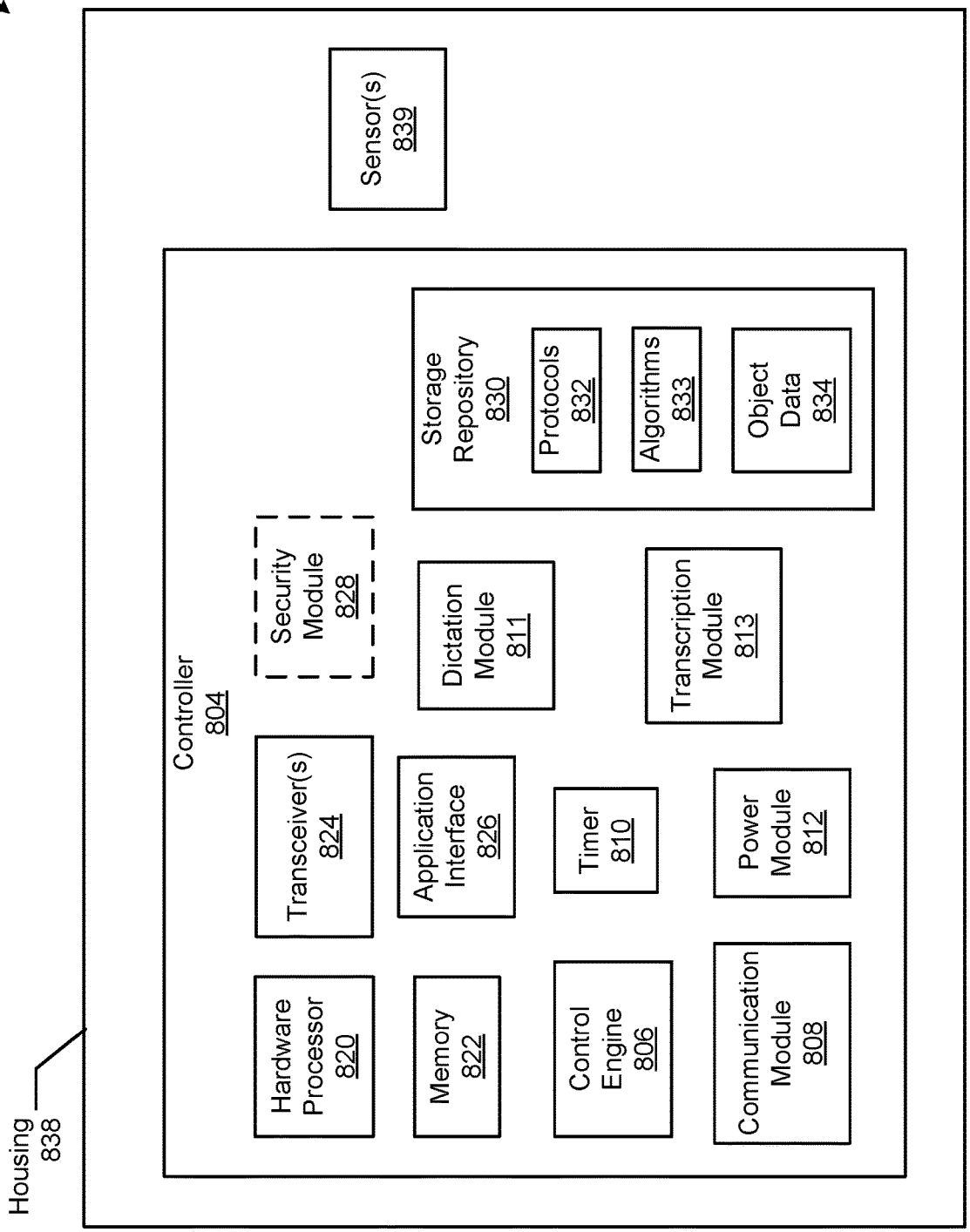
FIG. 8 shows a diagram of an integrated sensor device in accordance with certain example embodiments.

FIG. 8 shows a diagram of an integrated sensor module 851 in accordance with certain example embodiments. Referring to FIGS. 1 through 8, the integrated sensor module 851 of FIG. 8 can include one or more of a number of components. Such components, can include, but are not limited to, a controller 804 (which can include, for example, a control engine 806, a communication module 808, a timer 810, a dictation module 811, a transcription module 813, a power module 812, a storage repository 830, a hardware processor 820, a memory 822, one or more transceivers 824, an application interface 826, and, optionally, a security module 828) and one or more sensors 839. The components shown in FIG. 8 are not exhaustive, and in some embodiments, one or more of the components shown in FIG. 8 may not be included in an example integrated sensor device 851. Any component of the example integrated sensor device 851 can be discrete, combined with one or more other components of the integrated sensor device 851, and/or shared with the controller 104 of the electrical device 102-1 associated with the integrated sensor device 851.

The controller 804, the control engine 806, the communication module 808, the timer 810, the power module 812, the storage repository 830 (which can include protocols 831, algorithms 832, and object data 834), the hardware processor 820, the memory 822, the one or more transceivers 824, the application interface 826, and the security module 828 can be substantially the same as the corresponding components of the controller 104 discussed above with respect to FIG. 1. In the case of the power module 812 of the integrated sensor device 851, the power module 812 can be substantially the same as, at least in part, the power module 82 and/or the power supply 140 of the electrical device 102-1. As discussed above with respect to the sensor devices 165 of FIG. 1, each of the one or more sensors 839 of the integrated sensor device 851 are the components that actually measure one or more parameters. An example of a sensor 839 is a PIR sensor. Each component of the integrated sensor device 851 can be disposed within, on, or external from a housing 838 of the integrated sensor device 851.

A user device can include or have a beacon attached thereto. When multiple electrical devices are located in a common volume of space, one or more of the electrical devices can work together to accurately perform a supplemental service (e.g., capture a time count, perform a dictation, perform a transcription). In such a case, a controller of an electrical device and/or a network manager can follow one or more protocols to take certain actions and/or control certain electrical devices according to certain example embodiments. Example embodiments can be used to reduce costs, improve accuracy, and improve efficiency. Example embodiments can be used in any of a number of industries, including but not limited to the medical industry, sales, business accelerators, the healthcare industry, and management.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for tracking time of a user within a volume of space, comprising:
a first electrical device disposed at a first location in the volume of space and comprising a first receiver, a first transmitter, a first timer, and a first controller, wherein the first receiver has a first communication range that covers a first subset of the volume of space, wherein the first controller controls the first timer, and wherein the first electrical device performs a first primary function;
a first user device comprising a first beacon capable of communicating with the first receiver when the first beacon is located within the first communication range, wherein the first beacon wirelessly sends a plurality of first communication signals, wherein the plurality of first communication signals comprises a first user device identification of the first user, wherein the first controller of the first electrical device begins receiving the plurality of first communication signals at a first start time, as measured by the timer, when the first user device enters the first communication range, and wherein the first controller of the first electrical device stops receiving the plurality of first communication signals at a first end time, as measured by the timer, when the first user device leaves the first communication range; and a network manager that performs a timekeeping function, wherein the network manager is communicably coupled to the first electrical device and:
  receives at least one second communication signal from the first controller, wherein the at least one second communication signal comprises the first user device identification and the first start time;
  receives at least one third communication signal from the first controller, wherein the at least one third communication signal comprises the first user device identification and the first end time;
  identifies the first user based on the first user device identification in the at least one second communication signal;
  determines a first total time that the first user was located within the first subset of the volume of space, wherein the first total time comprises a difference between the first end time and the first start time; and
  records the first total time that the first user spent in the first subset of the volume of space,
  wherein communicating with the first user device and the network manager by the first controller is unrelated to the first controller controlling the first primary function of the first electrical device, wherein the first electrical device comprises a light fixture, and wherein the first primary function comprises providing general illumination to the volume of space.

2. The system of claim 1, wherein the first receiver continues communicating with the first beacon between the first start time and the first end time.

3. The system of claim 1, wherein the first controller further records audio during the first total time.

4. The system of claim 3, wherein the first controller further sends the audio recorded during the first total time to the network manager in at least one fourth communication signal, wherein the network manager dictates and transcribes the audio, wherein the network manager further enters text from transcribing the audio into a record associated with the first user.

5. The system of claim 1, further comprising:
  a second electrical device disposed at a second location in the volume of space and comprising a second receiver, a second transmitter, a second timer, and a second controller, wherein the second receiver has a second communication range that covers a second subset of the volume of space, and wherein the second controller controls the second timer, and wherein the second electrical device performs a second primary function,
  wherein the second controller, using the second receiver, at a second start time, as measured by the second timer, begins receiving a plurality of fourth communication signals from the first user device when the first user device enters the second communication range, wherein the plurality of fourth communication signals comprises the first user device identification,
  wherein the second controller stops receiving the plurality of fourth communication signals from the first user device at a second end time, as measured by the second timer, when the second user device leaves the second communication range,
  wherein the network is further communicably coupled to the second electrical device and:
    receives at least one fifth communication signal from the second controller, wherein the at least one fifth communication signal comprises the first user device identification and the second start time;
    receives at least one sixth communication signal from the second controller, wherein the at least one sixth communication signal comprises the first user device identification and the second end time;
    identifies the first user based on the first user device identification in the at least one fifth communication signal;
    determines a second total time that the first user was located within the second subset of the volume of space, wherein the second total time comprises a difference between the second end time and the second start time; and
    records the second total time that the first user spent in the second subset of the volume of space.

6. The system of claim 5, wherein the second receiver continues communicating with the first beacon between the second start time and the second end time.

7. The system of claim 6, wherein the first communication range and the second communication range cover a room within the volume of space, wherein the first communication range covers a first portion of the room, and wherein the second communication range covers a remaining portion of the room.

8. The system of claim 7, wherein the network manager determines that first controller and the second controller are located in the room and combines the first total time and the second total time.

9. The system of claim 1, further comprising:
  a second user device comprising a second beacon capable of communicating with the first receiver when the second beacon is located within the first communication range, wherein the second beacon wirelessly sends a plurality of fourth communication signals, wherein the plurality of fourth communication signals comprises a second user device identification of the second user,
  wherein the first controller of the first electrical device begins receiving, using the first receiver, the plurality of fourth communication signals from the second user device at a second start time, as measured by the first timer, when the second user device enters the first communication range,
  wherein the first controller of the first electrical device stops receiving the fourth plurality of communication signals at a second end time, as measured by the first timer, when the second user device leaves the first communication range,
  wherein the network manager further:
    receives at least one fifth communication signal from the first controller, wherein the at least one fifth communication signal comprises the second user device identification and the second start time;
    receives at least one sixth communication signal from the first controller, wherein the at least one sixth communication signal comprises the second user device identification and the second end time;
    identifies the second user based on the second user device identification in the at least one fifth communication signal;
    determines a second total time that the second user was located within the first subset of the volume of space, wherein the second total time comprises a difference between the second end time and the second start time; and
    records the second total time that the second user spent in the first subset of the volume of space.

10. The system of claim 9, wherein the first total time and the second total time at least partially overlap.

11. The system of claim 1, wherein the first controller is located remotely from a housing of the first electrical device.

12. The system of claim 1, wherein the first controller is located within a housing of the first electrical device.

13. The system of claim 1, wherein the first user is a medical professional.

14. The system of claim 1, wherein the first user is a salesperson.

15. A controller of an electrical device located in a subset of a volume of space, wherein the controller comprises a control engine, wherein the control engine is configured to:
  perform a primary function of providing general illumination to the volume of space, wherein the electrical device comprises a light fixture;
  receive, starting at a start time as measured by a timer of the electrical device, a plurality of first communication signals from a user device located in the volume of space within a communication range of the electrical device, wherein the plurality of first communication signals comprise a user device identification;
  stop receiving the plurality of first communication signals at an end time, as measured by the timer, when the user device leaves the communication range; and
  send at least one second communication signal to a network manager performing a timekeeping function, wherein the at least one second communication signal comprises the start time, the end time, the user device identification, and an identification of the electrical device,
  wherein the network manager uses the at least one second communication signal to record a total time that a user associated with the user device spent in the subset of the volume of space.

16. The controller of claim 15, wherein the control engine is further configured to:
  record audio during the total time that a user associated with the user device spent in the subset of the volume of space.

17. The controller of claim 16, wherein the control engine is further configured to:
  send at least one third communication signal to the network manager, wherein the at least one third communication signal comprises the audio.

18. The system of claim 5, wherein the second primary function of the second electrical device comprises providing general illumination to the volume of space.

19. The system of claim 5, wherein the second primary function of the second electrical device comprises failing to provide general illumination to the volume of space.

20. The system of claim 5, wherein the first communication range and the second communication range overlap with each other, wherein the first controller and the second controller are communicably coupled to each other.

* * * * *